United States Patent
Cha et al.

(10) Patent No.: US 9,396,737 B2
(45) Date of Patent: Jul. 19, 2016

(54) DISPLAY APPARATUS AND METHOD FOR CONTROLLING THE DISPLAY APPARATUS

(71) Applicant: SAMSUNG ELECTRONICS CO., LTD., Suwon-si (KR)

(72) Inventors: Tae-hwan Cha, Yongin-si (KR); Tae-je Park, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 75 days.

(21) Appl. No.: 14/149,378

(22) Filed: Jan. 7, 2014

(65) Prior Publication Data

US 2014/0195243 A1    Jul. 10, 2014

(30) Foreign Application Priority Data

Jan. 7, 2013  (KR) .................. 10-2013-0001803

(51) Int. Cl.

| | | |
|---|---|---|
| G10L 21/00 | (2013.01) | |
| G06F 3/16 | (2006.01) | |
| H04N 21/233 | (2011.01) | |
| H04N 21/422 | (2011.01) | |
| H04N 21/482 | (2011.01) | |
| H04N 21/654 | (2011.01) | |
| H04N 21/658 | (2011.01) | |

(52) U.S. Cl.
CPC .............. *G10L 21/00* (2013.01); *G06F 3/167* (2013.01); *H04N 21/233* (2013.01); *H04N 21/42203* (2013.01); *H04N 21/4826* (2013.01); *H04N 21/4828* (2013.01); *H04N 21/654* (2013.01); *H04N 21/6582* (2013.01)

(58) Field of Classification Search
CPC ............. G06F 3/167; H04N 21/42203; G06K 9/00013; G06Q 20/3227; G08B 7/068
USPC ........... 704/270.1, 275, 251, 254; 725/39, 87, 725/52, 40; 345/156; 705/27
See application file for complete search history.

(56) References Cited

U.S. PATENT DOCUMENTS

| | | | |
|---|---|---|---|
| 5,774,859 | A | 6/1998 | Houser et al. |
| 6,185,535 | B1 | 2/2001 | Hedin et al. |
| 6,762,692 | B1 | 7/2004 | Mingot et al. |
| 6,944,593 | B2 | 9/2005 | Kuzunuki et al. |
| 7,058,579 | B2 | 6/2006 | Kuzunuki et al. |
| 7,299,186 | B2 | 11/2007 | Kuzunuki et al. |

(Continued)

FOREIGN PATENT DOCUMENTS

| | | |
|---|---|---|
| JP | 11-126152 A | 5/1999 |
| JP | 2002-525690 A | 8/2002 |

(Continued)

OTHER PUBLICATIONS

International Search Report for PCT/KR2014/000158 dated Apr. 29, 2014 [PCT/ISA/210].

(Continued)

*Primary Examiner* — Charlotte M Baker
(74) *Attorney, Agent, or Firm* — Sughrue Mion, PLLC

(57) ABSTRACT

An electronic apparatus is provided, which includes an output, a voice collector configured to collect a user voice, and a controller configured to control the output to output a system response corresponding to the user voice, in which the controller is further configured to control the output such that a voice command guide applicable to a current situation of the electronic apparatus is outputted.

13 Claims, 17 Drawing Sheets

(56) References Cited

U.S. PATENT DOCUMENTS

| | | |
|---|---|---|
| 7,392,194 B2 | 6/2008 | Tanaka |
| 8,656,431 B2 | 2/2014 | Cavicchia |
| 2003/0074199 A1 | 4/2003 | Kuzunuki et al. |
| 2003/0074200 A1 | 4/2003 | Kuzunuki et al. |
| 2004/0199394 A1 | 10/2004 | Kuzunuki et al. |
| 2005/0149332 A1 | 7/2005 | Kuzunuki et al. |
| 2005/0165663 A1* | 7/2005 | Razumov .................. 705/27 |
| 2007/0213984 A1 | 9/2007 | Ativanichayaphong et al. |
| 2008/0022298 A1 | 1/2008 | Cavicchia |
| 2011/0067059 A1* | 3/2011 | Johnston et al. ............ 725/39 |
| 2012/0313849 A1 | 12/2012 | Bak et al. |
| 2013/0169524 A1* | 7/2013 | Han et al. .................... 345/156 |

FOREIGN PATENT DOCUMENTS

| | | |
|---|---|---|
| JP | 2003-115929 A | 4/2003 |
| JP | 2005-65156 A | 3/2005 |
| KR | 10-2000-0028191 A | 5/2000 |
| KR | 10-2009-0075788 A | 7/2009 |
| KR | 10-2012-0135855 A | 12/2012 |
| WO | 03030148 A1 | 4/2003 |

OTHER PUBLICATIONS

Written Opinion for PCT/KR2014/000158 dated Apr. 29, 2014 [PCT/ISA/237].

Communication issued on May 22, 2015 by the European Patent Office in related Application No. 14150232.8.

Communication issued Aug. 17, 2015, issued by the Korean Patent Office in counterpart Korean Patent Application No. 10-2013-0001803.

* cited by examiner

DISPLAY APPARATUS AND METHOD FOR CONTROLLING THE DISPLAY APPARATUS

CROSS-REFERENCE TO RELATED APPLICATION(S)

This application claims priority from Korean Patent Application No. 10-2013-0001803, filed on Jan. 7, 2013, in the Korean Intellectual Property Office, the disclosure of which is incorporated herein by reference in its entirety.

BACKGROUND

1. Field

Apparatuses and methods consistent with exemplary embodiments relate to displaying, and more particularly, to a display apparatus configured to be controlled according to user's voice, and a control method thereof.

2. Description of the Related Art

Different types of display apparatus are developed and supplied these days, thanks to advancements in electronic technology. As a result, users are provided with more varied functions. For example, televisions (TVs) are now able to connect to the Internet and provide internet service, enabling users to view numerous broadcasts including digital broadcast channels.

In the related art, one of the recently-developed technologies employs voice recognition to control a display apparatus with increased convenience and intuition. TVs are now able to recognize a user's voice and perform a function corresponding to the user's voice such as volume adjustment or channel change.

However, while the display apparatuses of the related art are capable of perceiving user's voice to provide functions that correspond to the perceived voice, they do not provide the users with interactive information. The display apparatuses also have limited use, due to the fact that the users do not know which words to use to perform voice control of the display apparatus, when they first use the display apparatuses.

SUMMARY

Exemplary embodiments address at least the above problems and/or disadvantages and other disadvantages not described above. Also, exemplary embodiments are not required to overcome the disadvantages described above, and an exemplary embodiment may not overcome any of the problems described above.

One or more exemplary embodiments provide a display apparatus configured to provide voice command guide applicable to current situation of the display apparatus, and a control method thereof.

According to an aspect of an exemplary embodiment, there is provided an electronic apparatus, including: an output; a voice collector configured to collect a user voice; and a controller configured to control the output to output a system response corresponding to the user voice. The controller may be further configured to control the output such that a voice command guide applicable to a current situation of the electronic apparatus is outputted.

In response to the system response corresponding to the user voice being outputted, the controller may be further configured to control the output to output the voice command guide including a guide which is related with the system response.

In response to a list of contents, resulting from a search performed in accordance with the user voice including a command to search for contents, being outputted, the controller may be further configured to control the output to output the voice command guide including a guide to filter the content included in the list of contents.

In response to a list of contents, resulting from a search performed in accordance with the user voice including a command to search for contents, being outputted, the controller may be further configured to control the output to output the at least one of voice command guide to execute specific content included in the content list, and voice command guide to output details of the specific content.

In response to an application executing screen, corresponding to the user voice including a command to execute the corresponding application, being outputted, the controller may be further configured to control the output to output the voice command guide including a guide applicable to the application executing screen. The outputting the application executing screen may include displaying the application executing screen on a screen included in the electronic apparatus.

The electronic apparatus may be a display apparatus.

The electronic apparatus may additionally include a first communicator configured to transmit the user voice to a first server and receive from the first server text information corresponding to the user voice, and a second communicator configured to transmit the received text information to a second server. In response to response information corresponding to the text information being received from the second server, the controller may be further configured to control the output such that the system response is outputted based on the response information.

According to an aspect of another exemplary embodiment, there is provided a control method of an electronic apparatus, including: collecting a user voice; transmitting the user voice to a first server and receiving from the first server text information corresponding to the user voice, transmitting the received text information to a second server; and in response to response information corresponding to the text information being received from the second server, outputting a system response corresponding to the user voice based on the response information and outputting a voice command guide applicable to a current situation of the electronic apparatus.

In response to a list of contents, resulting from a search performed in accordance with the user voice including a command to search for contents, being outputted, outputting the voice command guide including a guide to filter the content included in the list of contents.

In response to a list of contents, resulting from a search performed in accordance with the user voice including a command to search for contents, being outputted, outputting the voice command guide including at least one of voice a guide to execute specific content included in the content list, and a guide to output details of the specific content.

In response to an application executing screen, corresponding to the user voice including a command to execute the corresponding application, being outputted, outputting the voice command guide including a guide applicable to the application executing screen.

The electronic apparatus may be a display apparatus.

According to an aspect of another exemplary embodiment, there is provided a method of generating a voice command guide for an electronic device, the method including: receiving a user voice for controlling the electronic device; outputting a system response corresponding to the user voice; generating the voice command guide corresponding to the system response; and outputting the voice command guide.

The voice command guide may include information for controlling the electronic device including a voice command for controlling a function the electronic device.

The method may further include: searching for contents in response to the user voice including a command to search for contents; outputting a list of contents, resulting from the search for contents, as the system response; and outputting, in response to the outputting the list of contents, at least one of a guide for filtering the list of contents, a guide for executing a specific content included in the list of contents, or a guide for outputting details of a specific content included in the list of contents, as the voice command guide.

The method may further include: executing an application in response to the user voice including a command to execute the application; outputting an application executing screen, corresponding to the application, as the system response; and outputting, in response to the outputting the application executing screen, a guide for executing a function on the application executing screen as the voice command guide, in response to outputting the list of contents. The outputting the application executing screen may include displaying the application executing screen on a screen included in the electronic device.

The electronic device may include a screen. Outputting the system response and the outputting the voice command guide may include displaying the system response and the voice command guide on the screen.

The electronic device may include an audio output. The outputting the system response and the outputting the voice command guide may include outputting the system response and the voice command guide to the audio output as an audio output signal.

According to an aspect of another exemplary embodiment, there is provide an electronic device including: an output; an input configured to receive a voice of a user for controlling the electronic device; and a controller configured to control the output to output a system response corresponding to the received user voice and to output a voice command guide corresponding to the system response.

The voice command guide may include information for controlling the electronic device including a voice command for controlling a function the electronic device.

The controller may be further configured to: search for contents in response to the user voice including a command to search for contents, control the output to output a list of contents, resulting from the search for contents, as the system response, and control the output to output, in response to the output outputting the list of contents, at least one of a guide for filtering the list of contents, a guide for executing a specific content included in the list of contents, or a guide for outputting details of a specific content included in the list of contents, as the voice command guide.

The electronic device may further include a display. The controller may be further configured to: execute an application in response to the user voice including a command to execute the application, control the output to output an application executing screen, corresponding to the application, as the system response, and control the output to output, in response to the output outputting the application executing screen, a guide for executing a function on the application executing screen as the voice command guide, in response to outputting the list of contents. The output outputting the application executing screen and the guide for executing the function on the application executing screen may include outputting the application executing screen and the guide for executing function to the display to be displayed.

The electronic device may further include a display. The output outputting the system response and the outputting the voice command guide may include outputting the system response and the voice command guide to the display to be displayed.

The electronic device may further include an audio output. The output outputting the system response and the outputting the voice command guide may include outputting the system response and the voice command guide to the audio output to be output as audio.

According to various exemplary embodiments, because the voice command guide including usable voice information is provided, even novice users of the interactive system are able to conveniently use the system. Further, because a voice command guide related with the system response, outputted in accordance with the user's utterance, is provided, users can naturally learn the voices that are applicable to the situation.

BRIEF DESCRIPTION OF THE DRAWINGS

The above and/or other aspects will become more apparent by describing certain exemplary embodiments with reference to the accompanying drawings, in which.

DETAILED DESCRIPTION OF EXEMPLARY EMBODIMENTS

Figure 1:
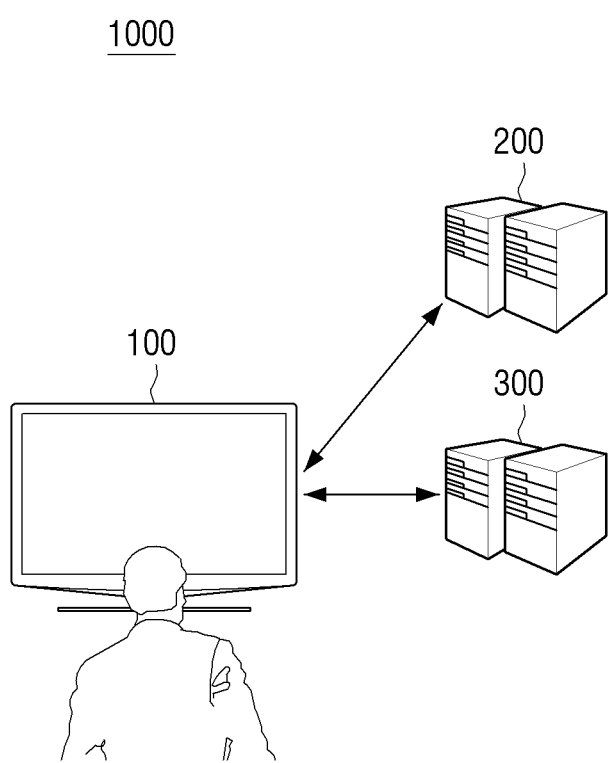
FIG. 1 is a view provided to explain an interactive system according to an exemplary embodiment.

Certain exemplary embodiments will now be described in greater detail with reference to the accompanying drawings.

In the following description, same drawing reference numerals are used for the same elements, even in different drawings. The matters defined in the description, such as detailed construction and elements, are provided to assist in a comprehensive understanding of the exemplary embodiments. Accordingly, it is apparent that the exemplary embodiments can be carried out without those specifically defined matters. Also, well-known functions or constructions are not described in detail since they would obscure the exemplary embodiments with unnecessary detail.

FIG. 1 is a view provided to explain an interactive system according to an exemplary embodiment.

Referring to FIG. 1, the interactive system 1000 includes a display apparatus 100, a first server 200, and a second server 300.

The display apparatus 100 may be controlled by a remote controller (not illustrated) provided to control the display apparatus 100. That is, the display apparatus 100 may perform an operation that corresponds to a received remote control signal from the remote controller (not illustrated). For example, when the display apparatus 100 is implemented as a TV, as illustrated in FIG. 1, the display apparatus 100 may perform an operation such as power on/off, channel change, or volume change, in accordance with a received remote control signal.

Further, the display apparatus 100 may perform various operations according to the user's voice.

The display apparatus 100 transmits a collected user voice to the first server 200. The first server 200, on receiving the user voice from the display apparatus 100, converts the received user voice into text information (or text) and transmits the text information to the display apparatus 100.

The display apparatus 100 transmits the text information received from the first server 200 to the second server 300. The second server 300, when receiving text information from the display apparatus 100, generates response information corresponding to the received text information and transmits it to the display apparatus 100.

Meanwhile, the display apparatus 100 may perform various operations based on the response information received from the second server 300.

For example, the display apparatus 100 may perform functions corresponding to the user voice. That is, among the functions provided by the display apparatus 100, the display apparatus 100 may perform a function that corresponds to the user voice. For example, in response to a user voice "turn to channel #O (i.e., channel number)," the display apparatus 100 may tune to channel #O and output the same in accordance with a control command received from the second server 300. To this purpose, the second server 300 may transmit a control command to the display apparatus 100 to perform a function corresponding to the user voice.

In the above example, the display apparatus 100 may also provide a system response corresponding to the corresponding function. That is, the display apparatus 100 may output information about the function performed in response to the user voice in the form of at least one of a voice and a user interface (UI) screen (text, image, etc.) In the above example, the display apparatus 100 may output a message in at least one of voice and UI screen forms, to indicate the information about the changed channel or to inform a user that the channel change is completed.

Further, the display apparatus 100 may output a system response in response to the user voice. The system response may be outputted in the form of at least one of a voice and a UI screen. For example, when a user voice, inquiring about a broadcast time of a specific program, is imputed, the display apparatus 100 may output a corresponding broadcasting time of the program in the form of at least one of a voice and a UI screen.

Further, the display apparatus 100 may output a voice command guide that is implementable in the current situation. That is, when the system response is outputted in response to the user voice, the display apparatus 100 may output the voice command guide related to the system response.

For example, it is assumed that the display apparatus 100 outputs a list of broadcast programs to be broadcast today, as a system response to the user voice "What is on TV today?" In this example, the display apparatus 100 may output voice command guide including information about user voice that can be used with respect to the list of broadcast programs outputted as the system response, which may include "What's on XXX (i.e., channel name)?", "What is featuring XXX (i.e., appearing person's name)?", "Can I see XXX (i.e., program name)?", "The third one," or "Can I see details of the third one?"

Accordingly, when the user voice included in the voice command guide is collected, the display apparatus 100 may perform a corresponding operation. In the example explained above, the display apparatus 100 may output a list of broadcast programs provided by the XXX (i.e., channel name) among the broadcast programs due to be broadcasted today, when the collected user voice is "What is on XXX (i.e., channel name)?" Further, when the collected user voice is "The third one," the display apparatus 100 may tune to a third broadcast program on the list outputted as the system response and output the same.

As explained above, because the display apparatus 100 provides the voice command guide, even users of the interactive system that have not used the system before can conveniently use the system. Further, because the display apparatus 100 provides the voice command guide that is related to the system response outputted in accordance with the user's utterance, the users can naturally learn the voices that are applicable after they make utterances.

Meanwhile, although the display apparatus 100 is implemented as a TV in FIG. 1, other embodiments are possible. For example, the display apparatus 100 may be implemented as various electronic apparatuses such as mobile phones such as smart phones, desktop personal computers (PCs), laptop PCs, or global positioning systems (GPSs).

Further, although the first and second servers 200, 300 are implemented as separate servers in FIG. 1, other embodiments are possible. For one example, the first and second servers 200, 300 may be implemented as one interactive server.

Figure 2:
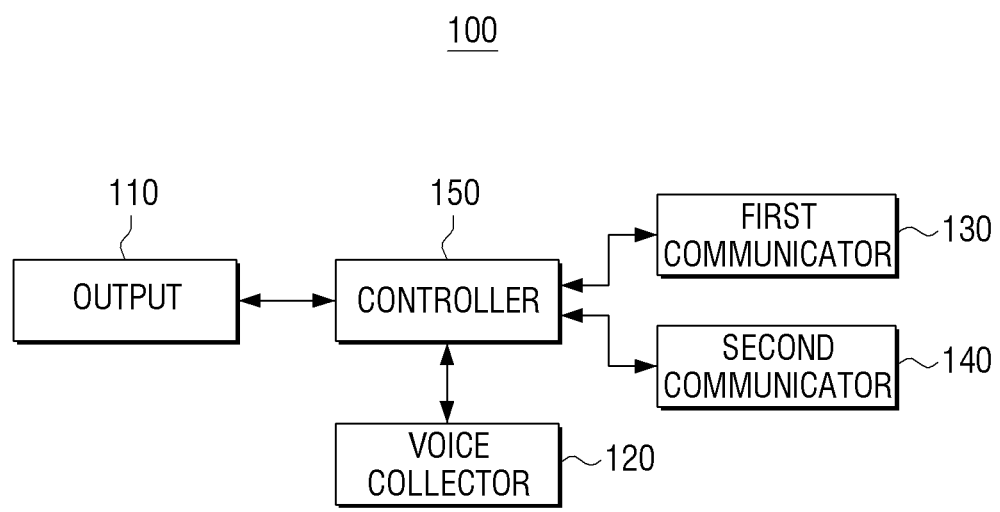
FIG. 2 is a schematic block diagram of a display apparatus according to an exemplary embodiment.

FIG. 2 is a schematic block diagram of a display apparatus according to an exemplary embodiment.

Referring to FIG. 2, the display apparatus 100 includes an output 110, a voice collector 120, and a controller 130.

The output 110 outputs at least one of a voice and an image. For example, the output 110 may output a system response, corresponding to the user voice collected at the voice collector 120, in the form of at least one of a voice and a graphic UI (GUI).

To that purpose, the output 110 may include a display (not illustrated) and an audio output (not illustrated).

The display (not illustrated) may be implemented as a liquid crystal display (LCD), an organic light emitting display (OLED), or plasma display panel (PDP). The display (not illustrated) may provide various display screens that can be provided through the display apparatus 100. For example, the display (not illustrated) may construct a UI screen, based on the system response to the user voice, including at least one of text, an image, an icon, and a GUI, and display the same.

Meanwhile, the audio output (not illustrated) may be implemented as an output port, such as a jack or a speaker, to output system response to the user voice in the voice form.

Further, the output 110 may output various contents. The contents may include broadcast contents, video on demand (VOD), premium VOD, digital versatile disc (DVD) content, etc. For example, the display (not illustrated) may output an image that constitutes the contents, and the audio output (not illustrated) may output an audio that constitutes the contents.

The voice collector 120 may collect the user voices. For example, the voice collector 120 may be implemented as a microphone to collect the user voices, either inside the display apparatus 100 as an embedded part, or separate from the display apparatus 100. When implemented as separate from the display apparatus 100, the voice collector 120 may be implemented in a form that can be easily grabbed by the user or that can be laid on a table, etc. The voice collector 120 may be connected to the display apparatus 100 by wires or a wireless network, to transmit the collected user voice to the display apparatus 100.

Meanwhile, the voice collector 120 may determine whether the collected voice belongs to the user or not, and filter noise (e.g., noise from air conditioner, vacuum cleaner, or music) from the collected user voice.

For example, when an analog form of the user voice is inputted, the voice collector 120 may sample the same and convert into it into a digital signal. The voice collector 120 may calculate the energy of the converted digital signal to determine whether the energy of the digital signal is equal to or greater than a preset value or not.

When the energy of the digital signal is equal to or greater than the preset value, the voice collector 120 may remove a noise component from the digital signal and transmit the resultant signal to the first communicator 130. The noise component, which may be sporadic in nature, may be generated from the domestic environment and may include, for example, an air conditioner sound, a vacuum cleaner sound, or music. Meanwhile, when the energy of the digital signal is less than the preset value, the voice collector 120 may wait for another input, instead of processing the digital signal.

Accordingly, since the entire audio processing is not activated by sounds other than a user voice, unnecessary power consumption can be prevented.

As shown in FIG. 1, the first communicator 130 may perform communication with the first server 200. For example, the first communicator 130 may transmit a user voice to the first server 200, and receive from the first server 200 the text information corresponding to the user voice.

As shown in FIG. 2, the second communicator 140 performs communication with the second server 300. For example, the second communicator 140 may transmit the received text information to the second server 300 and receive from the second server 300 the response information that corresponds to the text information.

Accordingly, the first and second communicators 130, 140 may perform communication with the first and second servers 200, 300 using various communication methods.

For example, the first and second communicators 130, 140 may perform communication with the first and second server 200, 300 using wired/wireless local area network (LAN), WAN, Ethernet, Bluetooth, Zigbee, universal serial bus (USB), IEEE 1394, or WiFi. To that purpose, the first and second communicators 130, 140 may employ chips or input ports that correspond to the communication method. For example, when communicating in a wired LAN manner, the first and second communicators 130, 140 may include a wired LAN card (not illustrated) and an input port (not illustrated).

In the exemplary embodiments explained above, to communicate with the first and second servers 200, 300, the display apparatus 100 may include separate communicators 130, 140. However, other embodiments are possible. For example, the display apparatus 100 may communicate with the first and second servers 200, 300 via one communication module.

Further, the first and second communicators 130, 140 may communicate with the first and second servers 200, 300, but are not limited thereto. For example, the first and second communicators 130, 140 may be connected to a web server (not illustrated) to perform web browsing.

The controller 150 may control the overall operation of the display apparatus 100. That is, the controller 150 may control the operations of the output 110, the voice collector 120, and the first communicator and the second communicator 130, 140. The controller 150 may include a module to control a central processing unit (CPU) and the display apparatus 100, and read only memory (ROM) and random access memory (RAM) to store data.

For example, the controller 150 may collect user voices through the voice collector 120 and control the first communicator 130 to transmit the collected user voices to the first server 200. The controller 150, when receiving text information corresponding to the user voice, may control the second communicator 140 to transmit the received text information to the second server 300.

Meanwhile, the controller 150 may control the output 110 to output a system response that corresponds to the user voice. For example, when receiving response information corresponding to the text information, the controller 150 may control the output 110 to output a system response corresponding to the user voice based on the response information.

The response information may include system response information to output the system response.

In one exemplary embodiment, the system response information may be in a text form that represents the system response outputted from the display apparatus 100 in response to the user voice, and the controller 150 may control the output 110 such that the system response corresponding to the user voice is outputted as at least one of a voice and a UI screen in response to the user voice, based on the system response information.

More specifically, using a text to speech (TTS) engine, the controller 150 may convert the system response information in text form into a voice and output the same through the output 110. The TTS engine is a module configured to convert text into speech, and it is thus possible to convert text into voice using various known TTS algorithms. Further, the controller 150 may control the display apparatus 100 such that a UI screen, including the text constituting system response information, is constructed and outputted via the output 110.

For example, when the display apparatus 100 implemented as TV collects the user voice "Let me know the most popular program," the second server 300 expresses in the text form "The most popular program is XXX (i.e., program name)" and transmit the same to the display apparatus 100. In this example, the controller 150 may convert the text form of "The most popular program is XXX (i.e., program name)" into a voice and output the same via the output 110, or construct a UI screen that includes the text "The most popular program is XXX (i.e., program name)" and output the same via the output 110. Further, the controller 150 may output a combination of a voice and a GUI.

In the exemplary embodiments explained above, the system response information transmitted from the second server 300 may be in the text form expressing the system response outputted from the display apparatus 100. However, other embodiments are possible. For example, the system response information may include voice data that constructs the system response outputted from the display apparatus 100, or part of the voice data that constructs the system response. Alternatively, the system response information may be in a control signal form to output the system response using voice or text previously stored in the display apparatus 100.

Accordingly, the controller 150 may output the system response by considering the form of the system response information.

For example, when the voice data that constructs the system response is received, the controller 150 may process the corresponding data into a form outputtable via the output 110 and output the same in a voice form.

On the other hand, i.e., when the control signal to output the system response is received, the controller 150 may search pre-stored data of the display apparatus 100 for the data that matches the control signal pre-stored, and process the voice or text data that is found into an outputtable form so that the same is outputted via the output 110. To that purpose, the display apparatus 100 may store in advance the voice or text data to provide the system response. For example, the display apparatus 100 may store the data in a complete sentence form such as "The channel change is completed," or may store the data in a partial sentence form such as "The channel is changed to . . . " In the latter case, the channel name that can complete the sentence may be received from the second server 300.

In another exemplary embodiment, the system response information may include various information so as to output the system response from the display apparatus 100 in response to the user voice.

For example, the system response information may include information about the content that is searched according to an intention of the user's utterance. That is, the second server 300 may search the contents that match the intention of the utterance included in the user voice, and transmit to the display apparatus 100 information about the searched content (e.g., at least one of content name, genre, broadcast time, cast, thumbnail image corresponding to the content, channel name that broadcasts the content, channel number, and staff).

For example, when the display apparatus 100 implemented as TV collects the user voice "What's on TV today?", the second server 300 may search for the broadcast program due to be broadcast today based on an electronic program guide (EPG), and transmit the information about the broadcast program to the display apparatus 100.

Accordingly, the controller 150 may generate a content list based on the information received from the second server 300 and output the generated content list. In one exemplary embodiment, the controller 150 may output the content list in the form of at least one of a voice and a UI screen.

For example, as a system response to the user voice, the controller 150 may construct a UI screen that includes a list of programs scheduled to be broadcasted today, and output the same. The controller 150 may generate a content list in which the searched content is listed in the order of broadcasting time.

The controller 150 may also add various information related to the searched content to the search list. For example, the controller 150 may add to the search list at least one of the name of the searched broadcast program, broadcasting time, channel name that provides the broadcast program, channel number, and production company, based on the information about the broadcast program received from the second server 300.

While the second server 300 may transmit the information about the content to the display apparatus 100 and the display apparatus 100 may generate a content list using the received information and output this as a system response, this is only an example.

Accordingly, other embodiments are possible. For example, the second server 300 may transmit information about a determined intention of the utterance by the user to the display apparatus 100 and the display apparatus 100 may output the system response corresponding to the user voice based on the information about the determined intention of the utterance included in the user voice.

For example, when the second server 300 determines the intention of the utterance included in the user voice to be a request for information about the broadcast programs scheduled to be broadcasted today, the second server 300 may transmit to the display apparatus 100 a control command to output a list of the broadcast programs scheduled to be broadcasted today. Accordingly, the controller 150 may search for the broadcast programs scheduled to be broadcasted today based on the EPG, and output the list of the broadcast programs as a system response.

Meanwhile, the response information may include a control command to control the function of the display apparatus 100. The control command may include a command to execute a function that corresponds to the user voice, from among the functions executable on the display apparatus 100. Accordingly, based on the control command received from the second server 300, the controller 150 may control the respective components of the display apparatus 100 to execute the function corresponding to the user voice.

For example, when the display apparatus 100 collects the user voice "turn up the volume," the second server 300 may transmit a control command, to increase the volume of the display apparatus 100, to the display apparatus 100. In one exemplary embodiment, the controller 150 may increase the volume of the audio outputted via the output 110 based on the control command. Further, when the display apparatus 100 collects the user voice "Execute web browsing, please," the second server 300 may transmit a control command, to execute the application related to the web browsing, to the display apparatus 100. In one exemplary embodiment, the controller 150 may execute the application for web browsing among the pre-stored applications, based on the control command.

However, other embodiments are also possible. For example, the controller 150 may control the respective components of the display apparatus 100 to perform various operations including power on/off, channel change, etc. in response to the collected user voice.

Further, the response information may include system response information related to the function that is executed in response to the control command. In one exemplary embodiment, the controller 150 may perform a function according to a control command, and control the display apparatus 100 such that the system response related to the executed function is outputted in a form of at least one of a voice and a UI screen, based on the system response information.

For example, when the display apparatus 100 implemented as TV collects the user voice "Turn to channel #11," the second server 300 may transmit to the display apparatus 100 a control command to change the channel of the display apparatus 100 to channel #11, along with a text form that expresses "Channel is changed to #11." In one exemplary embodiment, the controller 150 may change the broadcast channel outputted via the output 110 to channel #11 based on the control command. The controller 150 may then convert the text form that expresses "Channel is changed to #11" to a voice saying "Channel is changed to #11" and output the same via the output 110, or construct a UI screen that includes a text "Channel is changed to #11" and output the same via the output 110.

As explained above, the controller 150 may perform various operations according to the collected user voice. That is, the controller 150 may output a system response that corresponds to the user voice or control the display apparatus 100 such that a function corresponding to the user voice is executed.

Meanwhile, a system response corresponding to the user voice may be outputted without a separate function of the display apparatus 100 being executed, when the user voice directs to the display apparatus 100 to execute a function that cannot be executed on the display apparatus 100.

For example, for purposes of explanation it is assumed that the display apparatus 100 is implemented as a TV that does not support telephone call function. In this case, when the display apparatus 100 collects user voice "Call to XXX (i.e., another user), please," the second server 300 may transmit a control command to perform telephone call function to the display apparatus 100. However, because the display apparatus 100 does not support a function that corresponds to the control command, the controller 150 is not able to perceive the control command received from the second server 300. In this case, the controller 150 may output a system response "The function is not supported" via the output 110 in the form of at least one of a voice and a GUI.

Meanwhile, the controller 150 may control the display apparatus 100 such that a voice command guide, which can be used in the current situation of the display apparatus 100, is outputted.

The "current situation" may include a situation where a specific function is being executed in the display apparatus 100, such as, the initial screen being outputted, content being outputted, or an application being executed. Further, the initial screen may include a screen that is first provided in an interactive mode in which the display apparatus 100 is controlled by the user voice. For example, when a specific key provided on a manipulation panel of the display apparatus 100 is selected, or when a specific remote control signal is received from a remote controller (not illustrated), the controller 150 may operate in the interactive mode to display the initial screen and collect the voices uttered by the user.

More specifically, the controller 150 may output a voice command guide that represents the user voices that can execute a specific operation in a situation where a specific function is executed such as initial screen output, content output, or application executing.

For example, in a situation where the initial screen is being outputted, the voice command guide, including the user voice that can execute an operation executable on the display apparatus 100, such as, for example, "What is on TV today?", "Anything fun?", "Any new movies?", "Recommend popular one," "Turn to XXX (i.e., channel name)," "Execute web browser, please," may be outputted.

Further, in a situation where the content is being outputted, the voice command guide, including the user voice that is applicable to the content, may be outputted. For example, the voice command guide, including a user voice that can search the content or control (i.e., change the content or change the volume) the content, for example, "What is on TV today?", "Anything fun?", "Any new movies?", "Recommend popular one," "Turn to XXX (i.e., channel name)," or "Turn up the volume," may be outputted in a situation where the content is being outputted.

Further, in a situation where the application is being executed, the voice command guide including the user voice that is applicable to an application executing screen, may be outputted. For example, the voice command guide, including a user voice that is applicable for executing a specific function on a web page screen, such as, for example, "home page," "favorites," "refresh," "open new page," "close current page," "backward," "forward," or "end," may be outputted in a situation where the application for web browsing is being executed and a web page screen is subsequently being displayed.

When the system response corresponding to the user voice is outputted, the controller 150 may output a voice command guide related to the system response. That is, the controller 150 may output a system response that matches the intention of the user utterance included in the user voice, and output a voice command guide that represents the user voice that can execute a specific operation in response to the outputted system response.

More specifically, when the content list, searched for in accordance with the user voice to search content, is outputted, the controller 150 may output a voice command guide to filter the contents from the content list that includes the contents. That is, when the user voice with utterance intention to search content is received, the controller 150 may output a list of contents, searched for according to the user voice, as a system response, and output, as a voice command guide, the information about the user voice that can be used to re-search a specific content among the contents on the list.

For example, when the user voice "What is on TV today?" is collected, the controller 150 may output a system response based on the list of broadcast programs scheduled to be broadcasted today. In one exemplary embodiment, the controller 150 may output a voice command guide based on the information about the user voice that can be used for selecting a specific content from the list of the broadcast programs scheduled to be broadcasted today, such as, for example, "What is on XXX (i.e., channel name)?", "Can I see documentary program?", "Can I see program that features XXX (i.e., appearing person's name)?", "Find XXX (i.e., program name)".

Further, when the list of the contents, searched for in response to the user voice to search content, is outputted, the controller 150 may output at least one of voice command guide to execute a specific content included in the content list, and voice command guide to output details of the specific content. The "details" may include at least one of a name of the content, broadcasting time, cast, theme, channel number that provides the content, and channel name.

That is, when the user voice with the utterance intention to search content is received, the controller 150 may output a list of contents, searched for in response to the user voice, as a system response, and output a voice command guide about information on the user voices which can be used for executing a specific content among the contents on the list, or for outputting details of a specific content.

For example, when the user voice "What is on TV today?" is collected, the controller 150 may output a system response based on a list of broadcast programs scheduled to be broadcasted today. In one exemplary embodiment, the controller 150 may output voice command guide about information on the user voices which can be used for executing a specific broadcast program on the list of the broadcast programs scheduled to be broadcasted today, or for outputting details of a specific broadcast program such as, for example, "The third one," or "Can I see the details of the third one?"

When a corresponding application executing screen is outputted in response to a user voice to execute an application, the controller 150 may output a voice command guide which is applicable on an application executing screen. That is, when a user voice with an utterance intention to execute an application is received, the controller 150 may execute an application corresponding to the user voice and output a voice command guide based on the information about the user voice that can be used for executing a specific function in the corresponding application.

For example, when a user voice "Execute a web browser" is collected, the controller 150 may execute an application for web browsing and output a web page screen. In one exemplary embodiment, the controller may output voice command guide based on the information about user voice which may be used for executing a specific function on the web page screen, such as, for example, "home page," "favorites," "refresh," "open new page," "close current page," "backward," "forward," or "end."

In one exemplary embodiment, the controller 150 may output voice command guide at a preset period or at a time of executing a specific function.

For example, the controller 150 may output a voice command guide that is applicable in the current situation of the display apparatus 100 at a preset period. Further, the controller 150 may output the voice command guide at a time when the initial screen is outputted, a content is outputted, an application is executed, or a system response corresponding to user voice is outputted. Further, the controller 150 may output the voice command guide at a time when the initial screen is outputted, a content is outputted, an application is executed, or a system response is outputted corresponding to the user voice, and re-output the voice command guide at preset time period.

To that purpose, the display apparatus 100 may store information about user voices that are applicable in the current situation. That is, the display apparatus 100 may store information about the user voices that can be used in each situation. Accordingly, the controller 150 may determine information about the user voices that are applicable in the current situation of the display apparatus 100 and output the voice command guide based on the information about the determined user voices.

For example, when a list of contents, searched for according to a user voice to search contents, is outputted, the controller 150 may determine that the user voices to filter content, execute specific content, or output details of specific contents are usable. Accordingly, among the pre-stored information, the controller 150 may detect, from the pre-stored information, the information about the user voices that can be used in the situation where the content list is outputted, and output the detected information as the voice command guide.

Meanwhile, in certain exemplary embodiments, the display apparatus 100 may store information about user voices that are applicable in the current situation, although not limited thereto. Accordingly, in another exemplary embodiment, the second server 300 may transmit information about voice command guide that can be outputted in the current situation to the display apparatus 100 and the controller 150 may output the voice command guide using the received information.

For example, in response to the user voice "What is on TV today?" the second server 300 may transmit information about broadcast programs scheduled to be broadcasted today to the display apparatus 100. In this case, considering that the display apparatus 100 outputs a system response based on the list of broadcast programs scheduled to be broadcasted today using the received information, the second server 300 may transmit to the display apparatus 100 the information about the user voices that are applicable to the list of broadcast programs outputted as the system response, such as, for example, "The third one," "Can I see the details of the third one?", "What is on XXX (i.e., channel name)?", "Can I see documentary program?", "Can I see program that features XXX (i.e., appearing person's name)?", "Find XXX (i.e., program name)." In one exemplary embodiment, the controller 150 may output the voice command guide based on the information about the user voices which can be used on the list of broadcast programs using the received information.

Figure 3:
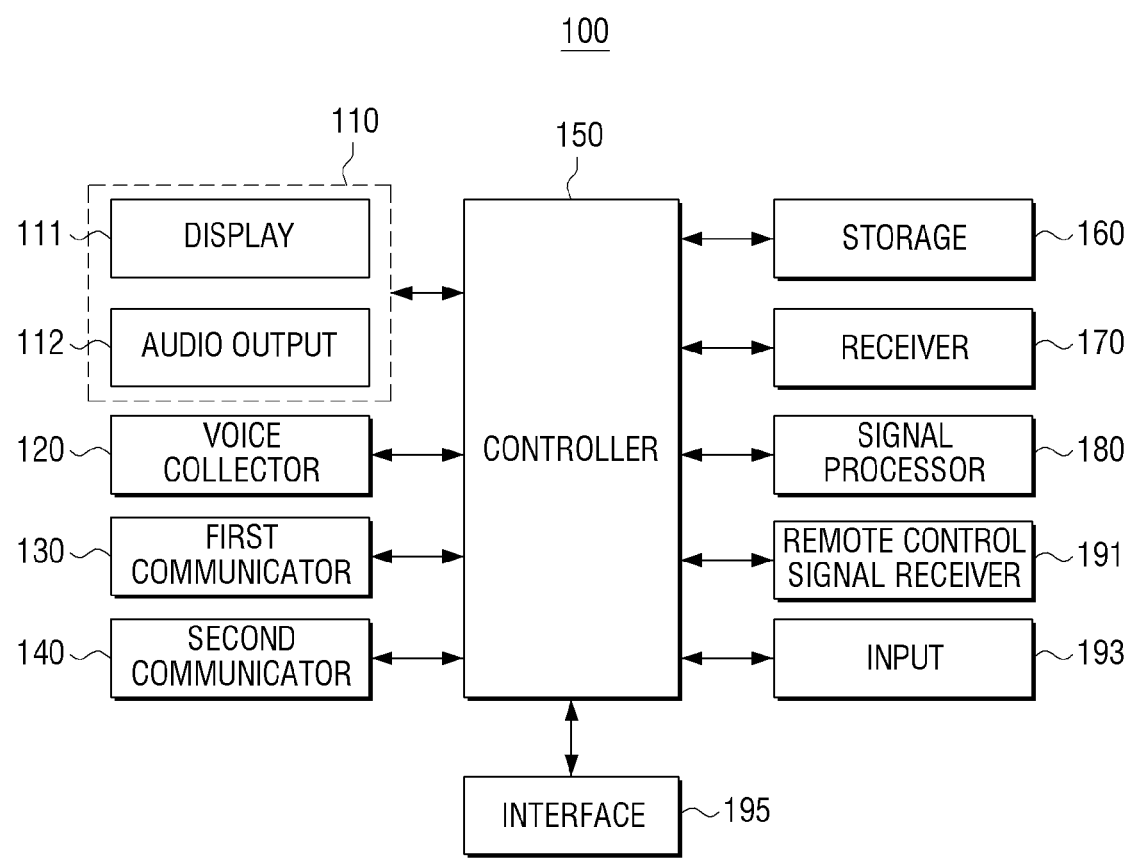
FIG. 3 is a detailed block diagram of the display apparatus of FIG. 2.

FIG. 3 is a detailed block diagram of the display apparatus of FIG. 2. Referring to FIG. 3, the display apparatus 100 may additionally include a storage 160, a receiver 170, a signal processor 180, a remote control signal receiver 191, an input 193, and an interface 195, in addition to the components illustrated in FIG. 2. The components may be controlled by the controller 150. Meanwhile, for the sake of brevity, the overlapping components between FIGS. 2 and 3 will not be redundantly explained below.

The storage 160 may be implemented as a storage medium, such as, for example, a memory, or a hard disk drive (HDD), that stores programs or the like that are necessary for the operation of the display apparatus 100. For example, the storage 160 may include a ROM to store programs to perform operation of the controller 150, and a RAM to temporarily store the data according to the operation of the controller. The storage 160 may additionally include an electrically erasable and programmable ROM (EEPROM) to store various reference data.

The storage 160 may store information about the user voices which are applicable in the current situation of the display apparatus 100. Accordingly, the controller 150 may determine information about the user voices that are applicable in the current situation of the display apparatus 100 and control the display apparatus 100 such that the determined user voices are outputted in a list form.

The receiver 170 receives various contents. More specifically, the receiver 170 may receive contents from a web server that transmits content files, using a broadcasting station that sends out broadcast programs using a broadcast network or the web server that sends out content files using the Internet.

In one exemplary embodiment of receiving content from a broadcasting station, the receiver 170 may be implemented as a form that includes a tuner (not illustrated), a decoder (not illustrated), or an equalizer (not illustrated). In another exemplary embodiment where the content is received from a source such as a web server, the receiver 170 may be implemented as a network interface card (not illustrated).

The signal processor 180 may perform signal processing of the content so that the content received via the receiver 170 or the interface 195 is outputted via the output 110.

More specifically, the signal processor 180 may convert the image included in the content into a form that can be outputted at the display 111, by performing operations such as decoding, scaling, or frame rate conversion. Further, the signal processor 180 may convert the audio signal included in the content into a form that can be outputted at the audio output 112 by performing signal processing such as decoding.

The remote control signal receiver 191 receives a control signal inputted from an external remote controller. Based on the control signal inputted to the remote control signal receiver 191, the controller 150 may perform various operations. For example, the controller 150 may perform an operation including power on/off, channel change, volume adjustment, or the like, in response to a control signal inputted at the remote control signal receiver 191.

The input 193 receives various user commands. The controller 150 may execute an operation corresponding to the user command inputted to the input 193. For example, the controller 150 may perform power on/off, channel change, or volume adjustment, in response to user command inputted to the input 193.

To that purpose, the input 193 may be implemented as an input panel. The input panel may be a touch pad, or a key pad including various function keys, numeral keys, special keys, or letter keys, or a touch screen.

The interface 195 performs communication with an external device (not illustrated). The external device (not illustrated) may be implemented as various types of electronic devices which can transmit content to the display apparatus 100.

For example, when the display apparatus 100 is implemented as TV, the external device (not illustrated) may be implemented as various forms of electronic devices which are connected to the display apparatus 100 and which can perform functions such as, for example, a set-top box, an audio device, or a game player.

For example, the interface 195 may communicate with an external device (not illustrated) according to various wired communication methods such as HDMI or USB, or wireless communication such as Bluetooth or Zigbee. To that purpose, the interface 195 may include a chip or an input port that corresponds to each communication method. For example, for communication with an external device (not illustrated) based on the HDMI communication method, the interface 195 may include a HDMI port.

Figure 4:
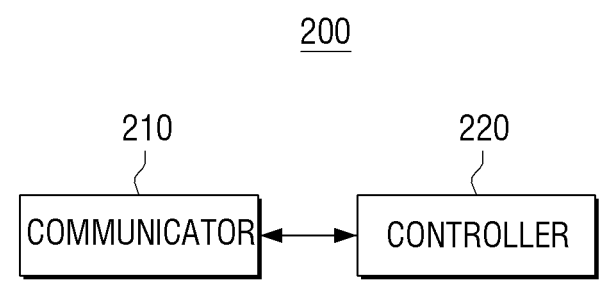
FIG. 4 is a block diagram of the first server of FIG. 1.

FIG. 4 is a block diagram of the first server illustrated in FIG. 1. Referring to FIG. 4, the first server 200 may include a communicator 210 and a controller 220.

The communicator 210 may communicate with the display apparatus 100. That is, the communicator 210 receives the user voice from the display apparatus 100 and transmits text information corresponding to the user voice to the display apparatus 100. To that purpose, the communicator 210 may include various communication modules.

The controller 220 controls the overall operation of the first server 200. In particular, when the user voice is received from the display apparatus 100, the controller 220 generates text information corresponding to the user voice and controls the first server 200 such that the generated information is transmitted to the display apparatus 100.

More specifically, the controller 220 may generate text information corresponding to the user voice, using a speech to text (STT) engine. The STT engine is a module that converts a speech signal (i.e. audio signal) into text. It is possible to convert the speech signal into text using various known STT algorithms.

For example, the controller 220 determines a voice interval, by detecting the beginning and ending of a voice uttered by the user in the received voice of the user. More specifically, the controller 220 calculates the energy of the received voice signal, categorizes the energy level of the voice signal according to the calculated energy, and detects the voice interval based on the dynamic programming. The controller 220 may detect a phoneme, i.e., the minimum unit of voice, in the detected voice interval based on an acoustic model, and convert the user voice into text by applying a hidden Markov model (HMM) to the generated phoneme data.

Figure 5:
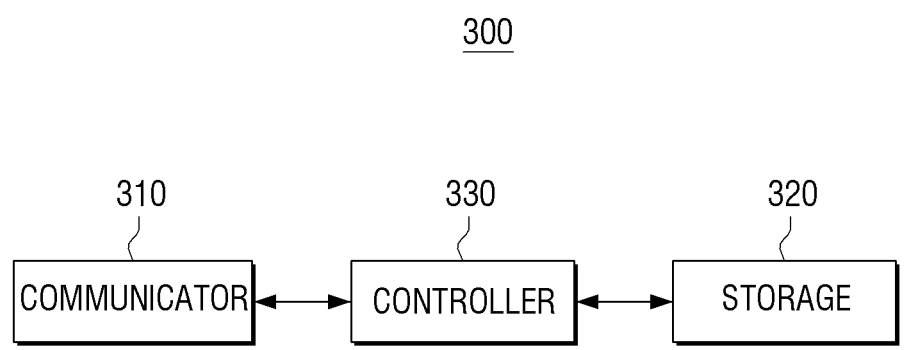
FIG. 5 is a block diagram of the second server of FIG. 1.

FIG. 5 is a block diagram of the second server of FIG. 1. Referring to FIG. 5, the second server 300 may include a communicator 310, a storage 320, and a controller 330.

The communicator 310 performs communication with the display apparatus 100. More specifically, the communicator 310 may receive text information from the display apparatus 100 and transmit response information corresponding to the text information to the display apparatus 100. To that purpose, the communicator 310 may include various communication modules.

Further, the communicator 310 may be connected to a web server (not illustrated) and perform web browsing. That is, the controller 330 may transmit various keywords to the web server (not illustrated) via the communicator 310 to perform web browsing, and receive the resultant web search corresponding to the keywords.

The storage 320 stores various information to generate response information that corresponds to the text information received from the display apparatus 100.

That is, the storage 320 may store interaction patterns per service domains. The service domains may be categorized, according to the topic of the voices uttered by the user, into "broadcast," "VOD," "application management," "device control," "information provision (weather, stock trading, news, etc.)," etc., although not limited thereto. Accordingly, the service domains may be categorized according to various other topics.

More specifically, the storage 320 may include a corpus database per service domains. The corpus database may take the form in which sample sentences and response to the same are stored.

That is, the storage 320 may store a plurality of sample sentences and responses to those, for each of the service domains. The storage 320 may also store, by tagging, the information to interpret the sample sentences and responses to the respective sample sentences.

For example, it is assumed that the sample sentence "When is XXX (i.e., broadcast program name) on?" is stored in the broadcast service domain.

In the above example, the storage 320 may store, by tagging, the information to interpret the sample sentence "When is XXX (i.e., broadcast program name) on?" That is, regarding the sample sentence "When is XXX (i.e., broadcast program name) on?" the storage 320 may store, by tagging, the information that indicates that "XXX (i.e., broadcast program name)" refers to the name of the broadcast program, that "When" refers to inquiry about broadcasting time, and that "?" refers to question. Further, the storage 320 may tag and store the information to the corresponding sample sentence, which indicates that the phrase "When is ~ on?" needs a word related with broadcast program to fill the same. The word related with the broadcast program may include the name of the broadcast program, appearing persons, or production manager.

Further, the storage 320 may tag a response to the sample sentence "When is XXX (i.e., broadcast program name) on?" and store the same. More specifically, the storage 320 may tag "The <broadcast program name> you inquired about is broadcasted at <broadcast time>" and store the same as a response to the sample sentence "When is XXX (i.e., broadcast program name) on?"

In another exemplary embodiment, it is assumed that a sample sentence "What is on TV today?" is stored in the broadcast service domain.

In the above example, the storage 320 may tag information to interpret the sample sentence "What is on TV today?" to the sample sentence and store the same. More specifically, the storage 320 may tag and store the information to the corresponding sample sentence, that the "on TV" refers to a broadcast program, "today," "on TV" or "What" indicates inquiry about a broadcast program scheduled to be broadcasted today, and "?" indicates that the sample sentence is a question. Further, the storage 320 may tag and store the information that words related with the broadcast time (e.g., now, tomorrow, etc.) may fill the sample sentence with the pattern of "What is on TV ~?"

In yet another exemplary embodiment, it is assumed that the sample sentence "Change to #X (i.e., channel number)" is stored in the device control service domain.

In the above example, the storage may tag and store the information to interpret the sample sentence like "Change to #X (i.e., channel number), please." More specifically, in the sample sentence "Change to #X (i.e., channel number), please," the storage 320 may tag and store the information to the corresponding sample sentence, which indicates that "#X (i.e., channel number)" refers to a channel number, that "Change" indicates a command to tune to a channel, and that "please" indicates that the sample sentence is a request sentence. Further, the storage 320 may tag and store the information in the corresponding sample sentence, which indicates that the word related with a broadcast program may fill the sample sentence with the pattern of "Change to ~, please." The words related with a broadcast program may include channel number, channel name, broadcast program name, appearing persons, or production manager.

The storage 320 may also tag and store a response to the sentence "Change to #X (i.e., channel number), please." More specifically, the storage 320 may tag and store a response "Channel changed to <channel number>" to the sentence "Change to #X (i.e., channel number), please."

In yet another exemplary embodiment, it is assumed that a sample sentence "Execute XX (i.e., application name), please" is stored in the device control service domain.

In the above example, the storage 320 may tag and store the information to interpret the sample sentence "Execute XX (i.e., application name), please" to the sample sentence. More specifically, in the sample sentence "Execute XX (i.e., application name)," the storage 320 may tag and store the information which indicates that "XX (i.e., application name)" refers to the name of the application, that "Execute" refers to a command to execute the application, and that "please" indicates that the sample sentence is a request sentence.

Further, the storage 320 may tag and store the information to the sample sentence, which indicates that the word related with function executable on the display apparatus 100 may fill the sample sentence with the pattern "Execute ~, please." The word related with the function executable on the display apparatus 100 may include names of applications, and names of functions executable on the display apparatus 100 such as a telephone call, for example.

In still another exemplary embodiment, it is assumed that the sample sentence "See more" is stored in the device control service domain.

In the above exemplary embodiment, the storage 320 may tag and store the information to interpret the sample sentence "See more" to the sample sentence. That is, the storage 320 may tag and store the information to the sample sentence such as "See more," which indicates that the sample sentence includes an utterance intention that requests information about the voice usable on the display apparatus 100.

The storage 320 may also tag and store control commands to control the display apparatus 100 with the respective sample sentences. In particular, the storage 320 may tag and store the control commands to control the display apparatus 100 to the sample sentences corresponding to the user voices to control the display apparatus 100.

In the exemplary embodiments explained above, the storage 320 may tag and store the control command to change a channel of the display apparatus 100 to channel #X, to the sample sentence such as "Change to #X (i.e., channel number), please." Further, the storage 320 may tag and store a control command to output voices that are usable on the display apparatus 100, to the sample sentence such as "See more."

Meanwhile, the exemplary embodiments are not limited to the stored sample sentences and responses exemplified above. Accordingly, various other sample sentences and corresponding responses may be stored per service domain.

The controller 330 controls the overall operation of the second server 300. More specifically, when the text information corresponding to the user voice is received from the display apparatus 100, the controller 330 generates response information corresponding to the received text information, and controls the communicator 310 such that the generated response information is transmitted to the display apparatus 100 via the communicator 310.

The controller 330 may determine the utterance intention included in the user voice by analyzing the text information, generate response information that corresponds to the determined utterance intention, and control the communicator 310 to transmit the same to the display apparatus 100.

To that purpose, the controller 330 may detect the corpus database that includes interaction patterns matching the received text information, and determine the service domain to which the user voice belongs.

More specifically, the controller 330 may compare the received text information with the samples stored per service domains, and determine that the domain that includes the sample sentence matching the received text information to be the domain to which the user voice belongs.

For example, when receiving text such as "When is XXX (i.e., broadcast program name) on?" or "What is on TV today?" from the display apparatus 100, the controller 330 may determine that the user voice collected at the display apparatus 100 belongs to the broadcast service domain. When receiving the text such as "Change to #X (i.e., channel number), please" or "Execute XX (i.e., application name), please" from the display apparatus 100, the controller 330 may determine that the user voice collected at the display apparatus 100 belongs to the device control service domain.

When no sample sentence is found to be matching the received text information, the controller 330 may determine a domain where the user voice belongs, based on statistics.

By way of example, it is assumed that the display apparatus 100 collects "Can I change to #X (i.e., channel number), please" and that the text corresponding to the collected user voice is transmitted to the second server 300. In the above example, the controller 330 may determine that the user voice is statistically similar to "Change to #X (i.e., channel number), please," using categorization models such as the hidden Markov model (HMM), condition random fields (CRF) or support vector machine (SVM), and determine that "Can I change to #X (i.e., channel number), please" belongs to the device control service domain.

The storage 320 may also store the text information that is determined to be statistically similar to the pre-stored sample sentence. In one exemplary embodiment, the storage 320 may store the text information as another sample sentence of the service domain where the statistically similar sample sentence belongs. Further, by referring to pre-stored sample sentences, the storage 320 may tag and store the information to interpret the newly-stored sample sentences, to the corresponding newly-stored sample sentence.

For example, it is assumed that the sentence "Can I change to #X (i.e., channel number), please" is stored as a new sample sentence.

In the above example, the storage 320 may tag and store the information to interpret the sample sentence such as "Can I change to #X (i.e., channel number), please" to the corresponding sample sentence, by referring to "Change to #X (i.e., channel number), please." That is, the storage 320 may tag and store the information to the corresponding sample sentence "Can I change to #X (i.e., channel number), please," which indicates that "#X (i.e., channel number)" refers to a number of channel, that "change" refers to a command to tune to a channel, and that "Can I ~, please" indicates that the sample sentence is a request sentence. Further, the storage 320 may tag and store the information to the corresponding sample sentence, which indicates that word related with broadcast program may fill the sample sentence with the pattern "Can I change to ~, please". The word related with the broadcast program may include the channel number, broadcast station name, broadcast program name, appearing persons, or production manager.

Further, the storage 320 may tag and store the response to "Can I change to #X (i.e., channel number), please," to the corresponding sentence. More specifically, the storage 320 may tag and store "Channel changed to <channel number>" as a response to "Can I change to #X (i.e., channel number), please."

Meanwhile, when there are a plurality of sample sentences matching the text information received from the display apparatus 100 and when the plurality of sample sentences belong to different service domains, the controller 330 may determine the corresponding service domains of the user voices based on statistical analysis.

That is, the controller 330 may weight the respective words (or, morphemes) constructing the text information received from the display apparatus 100 based on the frequency the words (or, morphemes) which are present in the respective service domains, and determine the service domain corresponding to the user voice by considering the applied weights.

For example, it is assumed that the text "Change to XXX (i.e., broadcast program name), please" is received from the display apparatus 100, in a state where the sample sentence "Change to XXX (i.e., broadcast program name), please" is stored in the broadcast service domain and the VOD service domain, respectively.

In the above example, the controller 330 may determine that the sample sentence matching "Change to XXX (i.e., broadcast program name), please" is present in the broadcast service domain and the VOD service domain, and weight words (or morphemes) that construct "Change to XXX (i.e., broadcast program name), please", i.e., weight "change" and "please" for the respective service domains, based on the frequency that "change" and "please" are present in the respective service domains.

For example, the controller 330 may calculate the weight of "change" in the broadcast service domain based on the rate of the sentences that include "change" therein in the all sample sentences stored in the broadcast service domain, and calculate the weight of "please" in the broadcast service domain based on the rate of the sample sentences that include "please" among all the sample sentences stored in the broadcast service domain.

In the likewise manner explained above, the controller 330 may calculate the weight of "change" in the VOD service domain based on the rate of the sentences that include "change" therein in the all sample sentences stored in the VOD service domain, and calculate the weight of "please" in the VOD service domain based on the rate of the sample sentences that include "please" among all the sample sentences stored in the VOD service domain.

Thereafter, the controller 330 may determine the service domain that the user voice belongs to, by calculating the weights applied to the respective words. Accordingly, in the example explained above, the controller 330 may compare the product of multiplying the weight applied to "change" by the weight applied to "please" in the broadcast service domain, with the product of multiplying the weight applied to "change" by the weight applied to "please" in the VOD service domain, and determine that the user voice belongs to the service domain with larger result.

That is, when the result of the calculation based on the weights applied in the broadcast service domain is larger than the result of the calculation based on the weights applied in the VOD service domain, the controller 330 may determine that "Change to XXX (i.e., broadcast program name), please" belongs to the broadcast service domain. On the contrary, when the result of the calculation based on the weights applied in the VOD service domain is larger than the result of the calculation based on the weights applied in the broadcast service domain, the controller 330 may determine that "Change to XXX (i.e., broadcast program name), please" belongs to the VOD service domain.

However, one of ordinary skill in the art will understand that the above is only provided for illustrative purposes. Accordingly, the controller 330 may statistically determine the service domain to which the user voice belongs, according to various methods.

Thereafter, the controller 330 extracts a dialogue act, main action, and component slot (or entity name) from the user voice, based on the service domain to which the user voice belongs.

The 'dialogue act' is the category related to the form of sentences, which indicates whether the corresponding sentence is a statement, a request, or a question.

The 'main action' refers to meaningful information that represents an act intended by the corresponding utterance in the dialogue in a specific domain. For example, in the broadcast service domain, the main action may include TV power on/off, broadcast program search, broadcast program time search, or broadcast program reserve. In another example, in the device control service domain, the main action may include device power on/off, play, or pause.

The 'component slot' refers to entity information of a specific domain that appears in the utterance, i.e., refers to additive information that specifies the meaning of an action as intended by a specific domain. For example, the component slot in the broadcast service domain may include genre, broadcast program name, broadcast time, channel name or actor/actress name, and may include in the device control service domain the name of external device, the manufacturer, or the like.

The controller 330 may determine the intention of utterance included in the user voice, using the extracted dialogue act, main action, and component slot, and generate response information corresponding to the determined utterance intention and transmit this to the display apparatus 100.

The response information may include system response information to output a system response from the display apparatus 100. To that purpose, the controller 330 may extract a reply to the determined utterance intention from the storage 320, and convert the extracted reply into text to thus generate system response information. Further, the controller 330 may search information corresponding to the determined utterance intention and generate system response information using the searched information.

Further, the response information may include a control command to execute a function that corresponds to the user voice. The control command may include a control command to control the display apparatus 100 to perform the function corresponding to the user voice. To that purpose, the controller 330 may generate a control command corresponding to the determined utterance intention and control the communicator 310 such that the generated control command is transmitted to the display apparatus 100.

Hereinbelow, a method of the controller 330 for generating response information corresponding to user voice will be explained in detail by referring to exemplary embodiments.

First, the controller 330 may extract a dialogue act, main action, and component slot from the user voice, using the information tagged to the sample sentence that is matched with the user voice, or that is statistically determined to be similar to the user voice, generate response information corresponding to the user voice, and transmit the same to the display apparatus 100.

For example, it is assumed that the text "When is XXX (i.e., broadcast program name) on?" is received from the display apparatus 100.

In the above example, the controller 330 may determine that the received text belongs to the broadcast service domain, extract a dialogue act, main action, and component slot from the user voice, using the information tagged to the sample sentence "When is XXX (i.e., broadcast program name) on?" that is matched with the received text in the broadcast service domain, and generate corresponding response information.

That is, the sample sentence "When is XXX (i.e., broadcast program name) on?" stored in the broadcast service domain is tagged with the information to interpret the sample sentence, including the information that indicates that "XXX (i.e., broadcast program name)" refers to a broadcast program, that "when" refers to request for broadcast time, and that "?" indicates that the sample sentence is a question. Accordingly, the controller 330 may determine that, based on the above information, the dialogue act of the sample sentence "When is XXX (i.e., broadcast program name) on?" is a question, the main action is the inquiry for broadcast time, and the component slot is XXX (i.e., broadcast program name). Accordingly, the controller 330 may determine that the utterance intention included in the user voice is to "inquire" about the "broadcast time" of "XXX".

Further, the controller 330 may search the storage 320 for the response tagged to the sample sentence "When is XXX (i.e., broadcast program name) on?" stored in the broadcast service domain, and generate system response information using the tagged response.

That is, the controller 330 may search for a response corresponding to the user voice, "The broadcast time of <broadcast program name> you inquired about is <broadcast time>," which is tagged to the sample sentence "When is XXX (i.e., broadcast program name) on?" stored in the broadcast service domain.

In the above example, the controller 330 may fill in the blank appearing in the searched response and generate a complete sentence.

For example, in the response "The broadcast time of <broadcast program name> you inquired about is <broadcast time>," the controller 330 may write in "XXX (i.e., broadcast program name)" in the blank <broadcast program name>. The controller 330 may also search for the broadcast time of the "XXX (i.e., broadcast program name)" based on the electronic program guide (EPG) of the "XXX (i.e., broadcast program name)" and write in another blank, <broadcast time>. As a result, the controller 330 may generate a complete sentence, "The broadcast time of the XXX (i.e., broadcast program name) you inquired about is seven o'clock, Saturday" as the system response information and transmit the generated system response information to the display apparatus 100.

Accordingly, the display apparatus 100 may output "The broadcast time of the XXX (i.e., broadcast program name) you inquired about is seven o'clock, Saturday" in the form of at least one of a voice and a UI screen, based on the system response information received from the second server 300.

In another exemplary embodiment, it is assumed that the text "What is on TV today?" is received from the display apparatus 100.

In the above example, the controller 330 may determine that the received text belongs to the broadcast service domain, extract a dialogue act, main action and component slot from the user voice, using the information tagged to the sample sentence "What is on TV today?" that is matched with the received text in the broadcast service domain, and generate corresponding response information.

That is, the sample sentence "What is on TV today?" stored in the broadcast service domain is tagged with the information to interpret the sample sentence, including the information that indicates that "today," "on TV," and "What" indicate an inquiry about a broadcast program scheduled to be broadcasted today, and that "?" indicates that the sample sentence is a question. Accordingly, the controller 330 may determine that, based on the above information, the dialogue act of the sample sentence "What is on TV today?" is a question, the main action is the inquiry about broadcast program scheduled to be broadcasted today, and the component slot is the broadcast program. Accordingly, the controller 330 may determine that the utterance intention included in the user voice is to "inquire" about the "broadcast programs" to be broadcasted "today."

In one exemplary embodiment, the controller 330 may refer to an EPG to search today's broadcast programs, and control the communicator 310 to transmit to the display apparatus 100 the information about the searched broadcast program which may include at least one of content name, genre, broadcast time, cast, corresponding thumbnail images, channel name where the content is broadcasted, or production crew.

The controller 330 may also control the communicator 310 to transmit the information about the determined utterance intention to the display apparatus 100. That is, the controller 330 may transmit a control command to output a list of today's broadcast programs to the display apparatus 100, when determining that the user's utterance intention relates to an inquiry about information about the broadcast programs scheduled to be broadcasted today.

Further, the controller 330 may control the communicator 310 such that the information about the searched broadcast program and information about the determined utterance intention are transmitted together to the display apparatus 100.

Accordingly, the display apparatus 100 may output the list of today's broadcast programs in the form of at least one of a voice and a UI screen, based on the information received from the second server 300.

In yet another exemplary embodiment, it is assumed that the text "Change to #X (i.e., channel number), please" is received from the display apparatus 100.

In the above example, the controller 330 may determine that the received text belongs to the device control service domain, extract a dialogue act, main action, and component slot from the user voice, using the information tagged to the sample sentence "Change to #X (i.e., channel number), please" that is matched with the received text in the device control service domain, and generate corresponding response information.

That is, the sample sentence "Change to #X (i.e., channel number), please" stored in the device control service domain is tagged with the information to interpret the sample sentence, including the information that indicates that "#X (i.e., channel number)" refers to channel number, that "Change" refers to a command to tune to a broadcast, and that "please" indicates that the sample sentence is a request. Accordingly, the controller 330 may determine that, based on the above information, the dialogue act of the sample sentence "Change to #X (i.e., channel number), please" is a request, the main action is the command to tune to a broadcast, and the component slot is #X (i.e., channel number). Accordingly, the controller 330 may determine that the utterance intention included in the user voice is to "request" "broadcast tuning" to "#X".

Further, the controller 330 may search the storage 320 for a response tagged to the sample sentence "Change to #X (i.e., channel number), please" stored in the broadcast service domain, and generate response information using the tagged response.

That is, the controller 330 may search a tagged response, "Channel changed to <channel number>" stored in the broadcast service domain, as a response corresponding to the user voice, "Change to #X (i.e., channel number), please."

In the above example, the controller 330 may fill in a blank appearing in the searched response to generate a complete sentence.

For example, the controller 330 may write "#X (i.e., channel number)" in the blank <channel number> appearing in the response like "Channel changed to <channel number>." Accordingly, the controller 330 may generate a complete sentence form of "Channel changed to #X" as the system response information corresponding to the user voice, and transmit the generated system response information to the display apparatus 100.

Further, the controller may search the storage 320 for a control command tagged to the sample sentence "Change to #X (i.e., channel number), please" stored in the device control service domain, and control the communicator 310 such that the tagged control command is transmitted to the display apparatus 100. That is, the controller 330 may transmit a tagged control command to change a channel of the display apparatus 100 to #X, corresponding to the sample sentence "Change to #X (i.e., channel number), please" stored in the device control service domain, to the display apparatus 100.

As a result, the display apparatus 100 may change a channel to #X based on the control command received from the second server 300, and output "Channel changed to #X" in the form of at least one of a voice and a UI screen, based on the system response information received from the second server 300.

Meanwhile, the controller 330 may generate a control command to execute a function of the display apparatus 100 based on the control command tagged to sample sentence, but is not limited thereto.

That is, the controller 330 may generate a control command based on a determined utterance intention, and transmit the same to the display apparatus 100. For example, when determining that the user's utterance intention is to request broadcast tuning to #X, the controller 330 may generate a control command to change a channel to #X and transmit the control command to the display apparatus 100.

Further, the controller 330 may transmit the control command to execute a function of the display apparatus 100, along with the system response information to output system response, but is not limited thereto. Accordingly, the controller 330 may transmit only the control command to execute a function of the display apparatus 100 to the display apparatus 100, depending on the user's utterance intention.

In the above exemplary embodiment, the display apparatus 100 may not output a separate system response, or output a system response using pre-stored data in the display apparatus 100.

In another exemplary embodiment, it is assumed that the text "Execute XX (i.e., application name), please" is received from the display apparatus 100.

In the above example, the controller 330 may determine that the received text belongs to the device control service domain, extract a dialogue act, main action, and component slot from the user voice, using the information tagged to the sample sentence "Execute XX (i.e., application name), please" that is matched with the received text in the device control service domain, and generate corresponding response information.

That is, the sample sentence "Execute XX (i.e., application name), please" stored in the device control service domain is tagged with the information to interpret the sample sentence, including the information that indicates that "XX (i.e., application name)" refers to a name of an application, that "Execute" refers to a command to execute an application, and that "please" indicates that the sample sentence is a request. Accordingly, the controller 330 may determine that, based on the above information, the dialogue act of the sample sentence "Execute XX (i.e., application name), please" is a request, the main action is the command to execute an application, and the component slot is XX (i.e., application name). Accordingly, the controller 330 may determine that the utterance intention included in the user voice is to "request" "application execution" regarding "XX (i.e., application name)."

In one exemplary embodiment, the controller may search the storage 320 for a control command tagged to the sample sentence "Execute XX (i.e., application name), please" stored in the device control service domain, and control the communicator 310 such that the tagged control command is transmitted to the display apparatus 100. That is, the controller 330 may transmit a tagged control command to execute XX (i.e., application name) on the display apparatus 100, corresponding to the sample sentence "Execute XX (i.e., application name), please" stored in the device control service domain, to the display apparatus 100.

As a result, the display apparatus 100 may execute XX (i.e., application name), based on the control command received from the second server 300.

Meanwhile, the controller 330 may generate a control command to execute a function of the display apparatus 100 based on the control command tagged to sample sentence, but is not limited thereto.

That is, the controller 330 may generate a control command based on the determined utterance intention and transmit the same to the display apparatus 100. For example, when determining that the user's utterance intention is to request execution of XX (i.e., application name), the controller 330 may generate a control command to execute XX (i.e., application name) and transmit the same to the display apparatus 100.

Meanwhile, the controller 330 may extract s dialogue act, main action, and component slot from the user voice by using the information tagged to the sample sentence that is statistically determined to be similar to the user voice, and generate corresponding response information.

For example, it is assumed that the text "When is YYY (i.e., broadcast program name) on?" is received from the display apparatus 100.

In the above example, the controller 330 may determine that the text "When is YYY (i.e., broadcast program name) on?" is statistically similar to the sample sentence "When is XXX (i.e., broadcast program name) on?" stored in the broadcast service domain. Accordingly, the controller 330 may extract the dialogue act, main action, and component slot from the user voice by using the information tagged to the sample sentence "When is XXX (i.e., broadcast program name) on?" stored in the broadcast service domain, and generate corresponding response information.

That is, the sample sentence "When is XXX (i.e., broadcast program name) on?" stored in the broadcast service domain is tagged with information to interpret the same, which indicates that the word related with broadcast program may be filled in the sentence pattern "When is ~ on?" Accordingly, the controller 330 may search for the meaning of "YYY (i.e., broadcast program name)" among the words related with the broadcast program such as broadcast program name, appearing person, or production manager.

To that purpose, the storage 320 may include an entity name dictionary or TIMEX dictionary which stores information about the components for each of the service domains.

That is, referring to entity name dictionary or TIMEX dictionary, the controller 330 may search for the meaning of "YYY (i.e., broadcast program name)" and determine that "YYY (i.e., broadcast program name)" refers to a broadcast program.

However, other exemplary embodiments are also possible. For example, the controller 330 may search for the meaning of "YYY (i.e., broadcast program name)" by using an EPG, or the like, or search for the meaning of "YYY (i.e., broadcast program name)" by using pre-stored sample sentences and a conditional random field (CRF).

Accordingly, the controller 330 may determine that the dialogue act of the text "When is YYY (i.e., broadcast program name) on?" received from the display apparatus 100 is a question, the main action is to inquire broadcast time, and the component slot is YYY (i.e., broadcast program name). The controller 330 may also determine that the utterance intention included in the user voice is to "inquire" about "broadcast time" of "YYY."

Further, the controller 330 may generate system response information about "When is YYY (i.e., broadcast program name) on?", by using the response tagged to the sample sentence "When is XXX (i.e., broadcast program name) on?" stored in the broadcast service domain, and transmit the generated system response information to the display apparatus 100.

That is, the controller 330 may search for a response corresponding to the user voice, "The broadcast time of <broadcast program name> you inquired about is <broadcast time>", which is the tagged response to the sample sentence "When is XXX (i.e., broadcast program name) on?" stored in the broadcast service domain. The controller 330 may also generate system response information corresponding to the user voice based on the complete sentence, "The broadcast time of YYY (i.e., broadcast program name) is 11 o'clock, Wednesday", and transmit the generated system response information to the display apparatus 100.

Meanwhile, when some of the sentence data of the system response outputted from the display apparatus 100 is stored, the controller 330 may control the communicator 310 such that only certain text may be transmitted to the display apparatus 100 to complete the corresponding sentence.

For example, when the response such as "The broadcast time of <broadcast program name> you inquired about is <broadcast time>" is pre-stored in the display apparatus 100, the controller 330 may control the communicator 310 such that the broadcast program name inquired about by the user and the broadcast time thereof are transmitted in the text form to the display apparatus 100 to complete the response stored in the display apparatus 100. In one exemplary embodiment, the controller 330 may transmit a separate control signal to output a pre-stored response to the display apparatus 100, to the display apparatus 100.

Accordingly, the display apparatus 100 may write the text received from the second server 300 in the pre-stored response, to thus output the system response, which may be, "The broadcast time of XXX (i.e., broadcast program name) is 7 o'clock, Saturday."

Meanwhile, the controller 330 may extract the dialogue act, main action, and component slot using the information tagged to the sample sentence, but is not limited thereto. That is, the controller 330 may extract the dialogue act and main action from the user voice by using a maximum entropy classifier (MaxEnt), and extract the component slot by using the conditional random field (CRF).

Of course, the exemplary embodiments are not limited to any specific examples only. Accordingly, the controller 330 may extract the dialogue act, the main action, and the component slot from the user voice in many known manners.

Meanwhile, when the controller 330 is not able to determine the utterance intention of the user included in the currently-received user voice, the controller 330 may refer to the previously-received user voices to determine the user's utterance intention included in the currently-received user voice.

More specifically, when the controller 330 is not able to determine the user's utterance intention included in the currently-received user voice based on the service domain to which the previously-received user voice belongs, the controller 330 may determine the user's utterance intention included in the currently-received user voice, by referring to the previously-received user voices.

For example, the controller 330 may determine whether or not the currently-received user voice corresponds to the initial user utterance in the dialogue pattern, by comparing the currently-received user voice with the dialogue pattern stored in the corpus database, and in response to determining that it does not correspond to the initial user utterance, may determine the user's utterance intention included in the currently-received user voice by referring to the previously-received user voices.

To that purpose, the storage 320 may store the respective sample sentences of the respective service domains in a hierarchical manner. That is, the storage 320 may store the top hierarchy level based on the sample sentence that matches the user voice that can be initially uttered by the user in each service domain, and store the sample sentences corresponding to the user voices that can follow thereafter in a hierarchical manner.

For example, the storage 320 may store "What is on TV today?" as the top hierarchy layer in the broadcast service domain, and store the lower layer sample sentences such as "The third one," "Can I see the details of the third one, please," "What is on XXX (i.e., channel name)?", "Which is the documentary program?", "Can I see the program that features XXX (i.e., appearing persons' name)?", or "Can I see XXX (i.e., broadcast program name), please?"

In another exemplary embodiment, the storage 320 may store "Execute XXX (i.e., application name), please" as the top hierarchy layer in the device control service domain. When the "XXX (i.e., application name)" is a web browsing application, the storage 320 may store the lower layer sample sentences of "Execute XXX (i.e., application name), please," based on the sample sentences executable on the web browsing application such as, "home page," "favorites," "refresh," "open new page," "close current page," "backward," "forward," or "end."

A method for determining the user's utterance intention included in the currently-received user voice with reference to the previously-received user voices, will be explained in greater detail below.

First, it is assumed that the user voice "What is on TV today?" is inputted, and that the user voice "What is on XXX (i.e., channel name) today?" is inputted thereafter. In the above example, when the controller 330 determines that the user voice "What is on XXX (i.e., channel name) today?" does not corresponds to the initial user utterance in the broadcast service domain, the controller 330 may determine the utterance intention of "What is on XXX (i.e., channel name) ?" based on the previously-received user voice "What is on TV today?"

Accordingly, the controller 330 may determine that, using the previously-received user voice "What is on TV today?", the utterance intention of "What is on XXX (i.e., channel name)?" is to "inquire" about "broadcast program" scheduled to be broadcasted on "XXX (i.e., channel name)" among the programs broadcasted today.

Accordingly the controller 330 may generate response information corresponding to the determined utterance intention and transmit the same to the display apparatus 100. That is, according to the determined utterance intention, the controller 330 may search for the broadcast program broadcasted on XXX (i.e., channel name) among the today's broadcast programs, and transmit the information about the searched broadcast program to the display apparatus 100.

Further, it is assumed that the user voice "What is on TV today?" is inputted, and the user voice "The third one" is inputted thereafter. In the above example, when the controller 330 determines that the user voice "The third one" does not correspond to the initial user utterance in the broadcast service domain, the controller 330 may determine the utterance intention of "The third one" based on the previously-received user voice "What is on TV today?"

More specifically, the controller 330 may determine that the utterance intention is to "request" "tuning" to "broadcast program" which is the "third one" on the list of the broadcast programs outputted from the display apparatus 100 in response to the previously-received user voice "What is on TV today?" Accordingly, the controller 330 may generate response information corresponding to the determined utterance intention and transmit the same to the display apparatus 100. That is, the controller 330 may transmit a control command, to tune to a broadcast program that is the third one on the list of broadcast programs outputted from the display apparatus 100, to the display apparatus 100, according to the determined utterance intention.

Meanwhile, although it is assumed that the user voice "What is on TV today?" is inputted and followed by "What is on XXX (i.e., channel name)" and "The third one," the exemplary embodiments are not limited to the above specific examples only. That is, various other hierarchical sample sentences may also be interpreted based on the previously-received user voices.

In another exemplary embodiment, it is assumed that the user voice "Execute XXX (i.e., web browsing application name), please" is inputted, and then followed by the user voice "refresh." In the above example, when the controller 330 determines that the user voice "refresh" does not correspond to the initial user utterance in the device control service domain, the controller 330 may determine the utterance intention of "refresh" based on the previously-received user voice "Execute XXX (i.e., web browsing application name), please."

That is, the controller 330 may determine that the utterance intention is to "request" to "refresh" the "web browsing screen," by using the previously-received user voice "Execute XXX (i.e., web browsing application name), please."

As a result, the controller 330 may generate response information corresponding to the determined utterance intention and transmit the same to the display apparatus 100. That is, in the exemplary embodiments explained above, the controller 330 may transmit a control command, to refresh the web browsing screen, to the display apparatus 100.

Meanwhile, although it is assumed that the user voice "Execute XXX (i.e., web browsing application name), please" is inputted, and then followed by the user voice "refresh," the exemplary embodiments are not limited to specific example only. Accordingly, various other hierarchical sample sentences may be interpreted based on the previously-received user voices.

Further, although not limited thereto, the controller 330 may determine whether or not the currently-received user voice corresponds to the initial user utterance in the dialogue pattern, and when determining that it does not correspond to the initial user utterance, the controller 330 may determine the user's utterance intention included in the currently-received user voice by referring to the previously-received user voice.

Accordingly, the controller 330 may use the previously-received user voice when it is not possible to determine the utterance intention included in the currently-received user voice, by referring to the service domain that includes the previously-received user voice.

For example, it is assumed that the user voice "What is on TV today?" is inputted and then is followed by the user voice "What is on XXX (i.e., channel name)?" Since it is not possible to determine the utterance intention included in the user voice "What is on XXX (i.e., channel name)?" in the broadcast service domain, the controller 330 may determine the utterance intention of "What is on XXX (i.e., channel name) ?" based on the previously-received user voice "What is on TV today?"

That is, the controller 330 may determine that the utterance intention of "What is on XXX (i.e., channel name)?" is to "inquire" about "broadcast program" broadcasted on "XXX (i.e., channel name)" among the programs broadcasted today, by using the previously-received user voice "What is on TV today?"

In another exemplary embodiment, it is assumed that the user voice "Execute XXX (i.e., web browsing application name), please" is inputted and then followed by the user voice "refresh." In the above example, since it is not possible to determine the utterance intention included in the user voice "refresh" in the device control service domain, the controller 330 may determine the utterance intention of "refresh" based on the previously-received user voice "Execute XXX (i.e., web browsing application name), please."

That is, by using the previously-received user voice "Execute XXX (i.e., web browsing application name), please," the controller 330 may determine that the utterance intention of "refresh" is to "request" to "refresh" the "web browsing screen."

Meanwhile, the storage 320 may store the information about the user voice that is outputted from the display apparatus 100 as the voice command guide. That is, the storage 320 may store the information about the user voice usable in each situation of the display apparatus 100.

As a result, the controller 330 may determine the information about user voice applicable in the current situation of the display apparatus 100 by using the pre-stored information, and transmit the determined information about the user voice to the display apparatus 100.

For example, when the user voice "What is on TV today?" is received, the controller 330 may determine the utterance intention of "What is on TV today?" is to "inquire" about "broadcast program" broadcasted "today," and transmit the information about today's broadcast program to the display apparatus 100. The controller 330 may transmit information about user voices applicable for the broadcast program list outputted as the system response, such as, for example, "The third one," "Can I see the details of the third one, please," "What is on XXX (i.e., channel name)?", "Which is the documentary program?", "Can I see the program that features XXX (i.e., appearing persons' name)?", or "Can I see XXX (i.e., broadcast program name), please?"

In another exemplary embodiment, when the user voice "Execute XX (i.e., name of application related to web browsing), please" is received, the controller 330 may determine the utterance intention of "Execute XX (i.e., name of application related to web browsing), please" is to "request" to "execute" the "XX (i.e., name of application related to web browsing)," and transmit a control command to execute the XX (i.e., name of application related to web browsing) to the display apparatus 100. The controller 330 may transmit information about user voices applicable for the application executed on the display apparatus 100, such as, for example, "home page," "favorites," "refresh," "open new page," "close current page," "backward," "forward," or "end."

Various exemplary embodiments will be explained below with reference to FIGS. 6 to 11.

Figure 6:
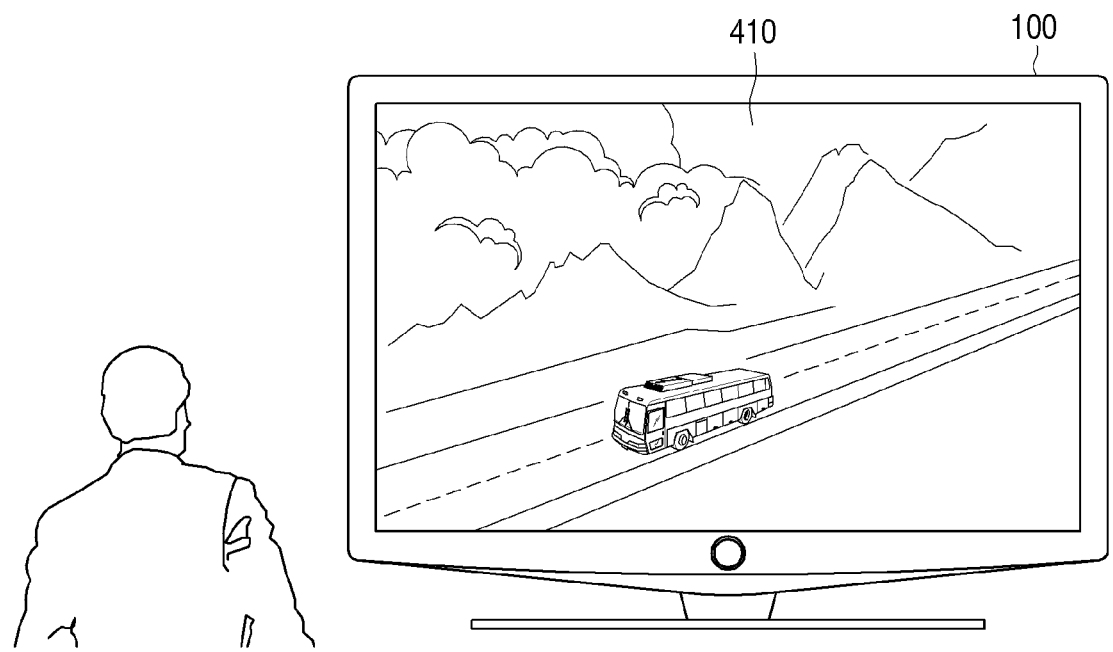
FIGS. 6 to 11 are views provided to explain a method for providing voice command guide according to an exemplary embodiment.
Figure 7A:
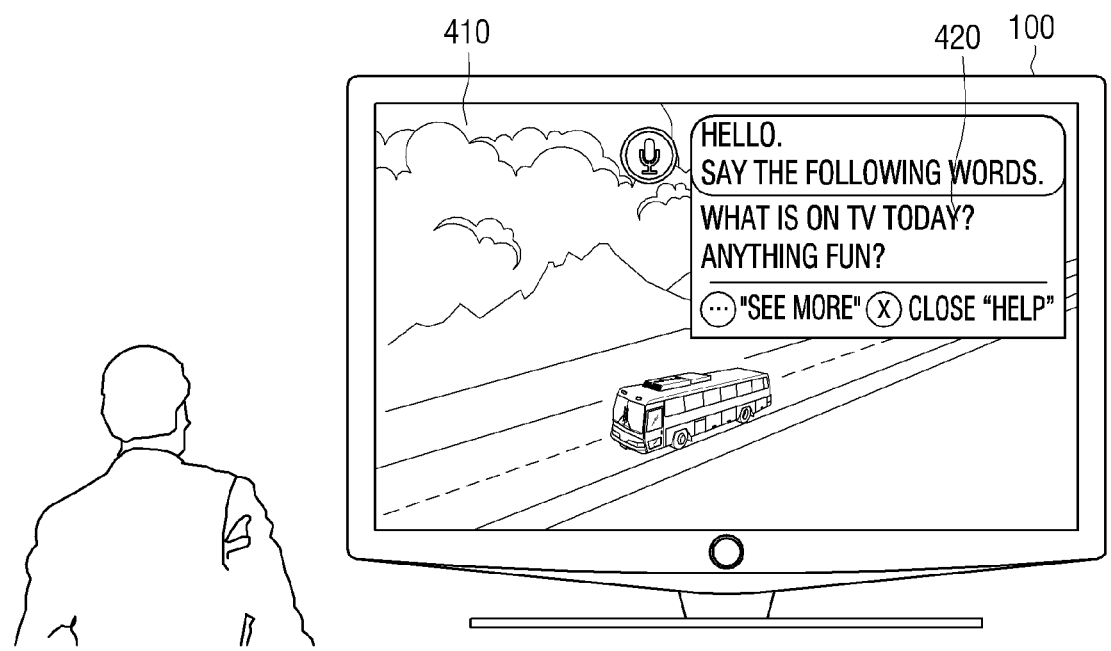
Figure 7B:
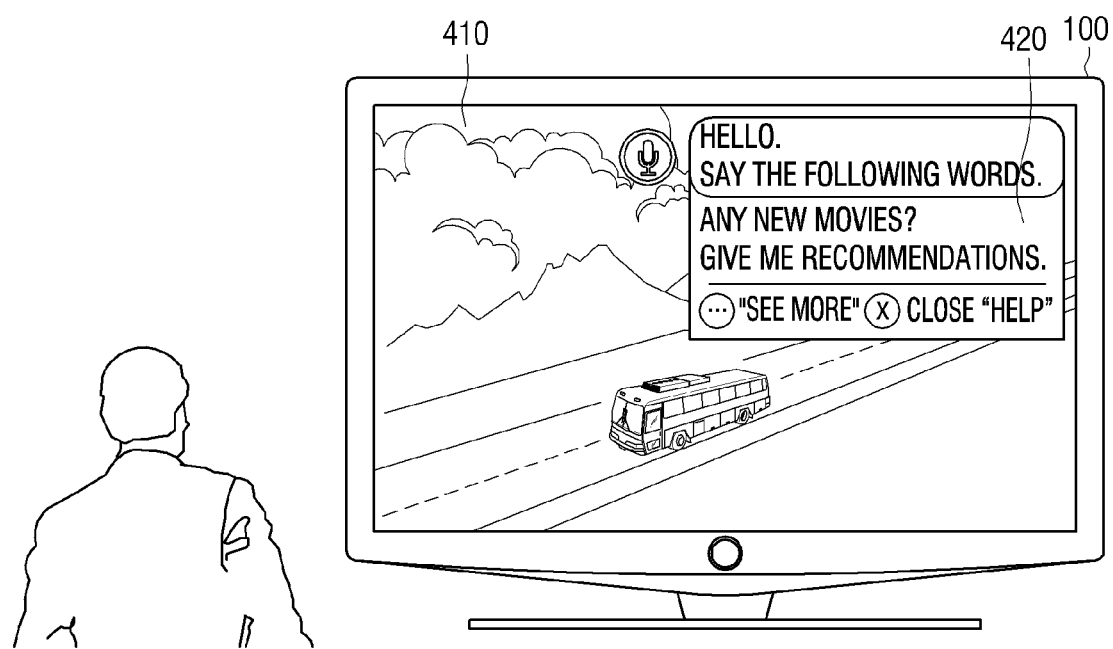
Figure 7C:
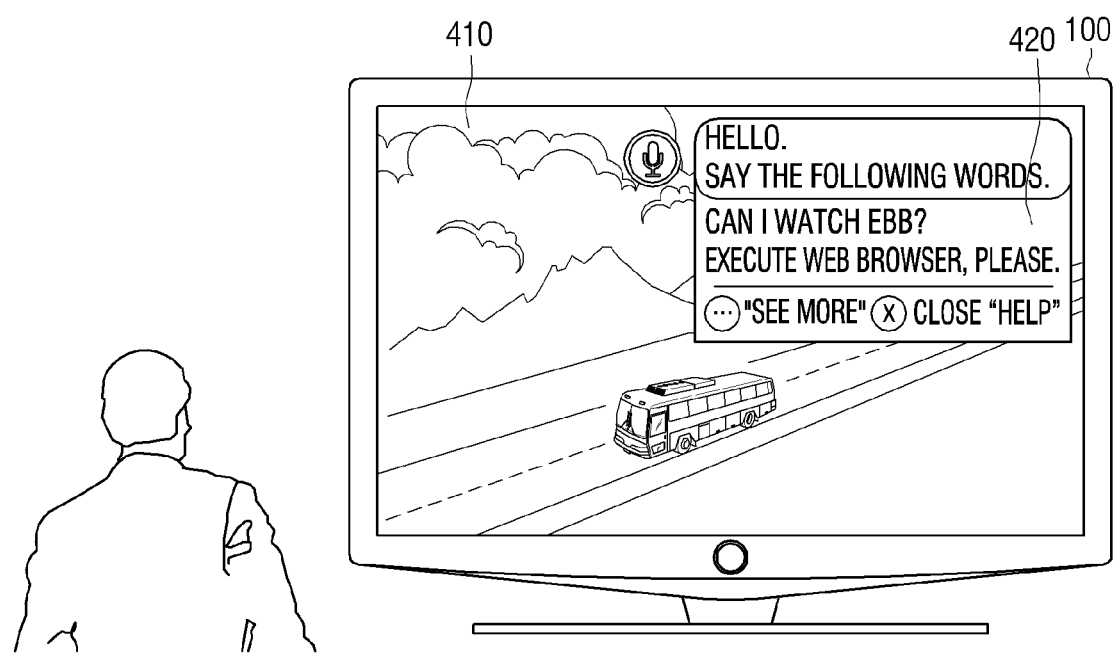

Referring to FIG. 6, the controller 150 displays initial screen 410. Referring to FIGS. 7A to 7C, the controller 150 may display voice command guide 420 on a predetermined area of the initial screen 410.

The voice command guide 420 may display text in a slide show form representing user voices that can execute the available functions of the display apparatus 100, such as, for example, "What is on TV today?", "Anything fun?", "Any new movies?", "Give me recommendations," "Can I watch EBB (i.e., channel name)," and "Execute web browser, please."

Figure 8A:
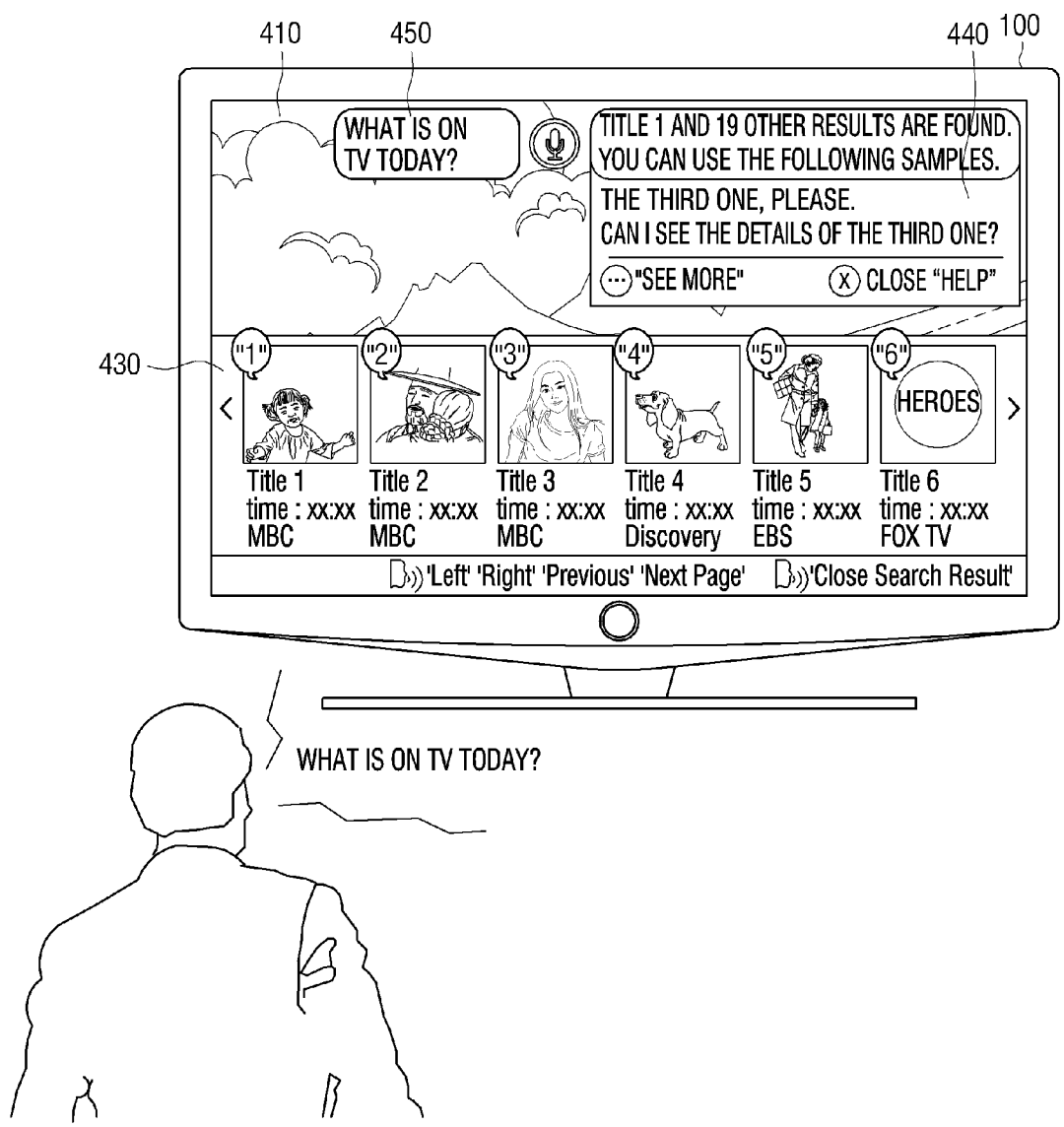
Figure 8B:
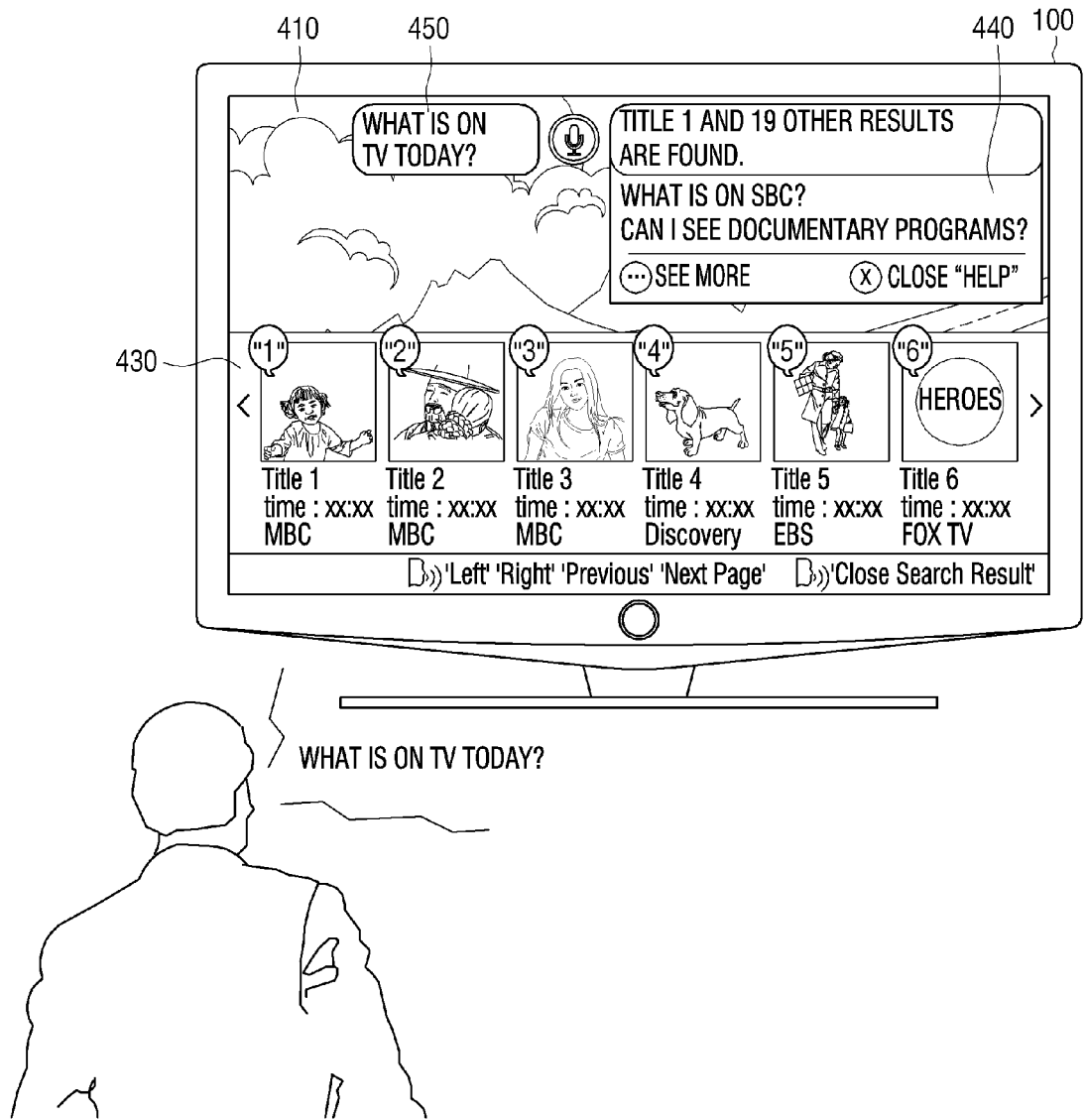
Figure 8C:
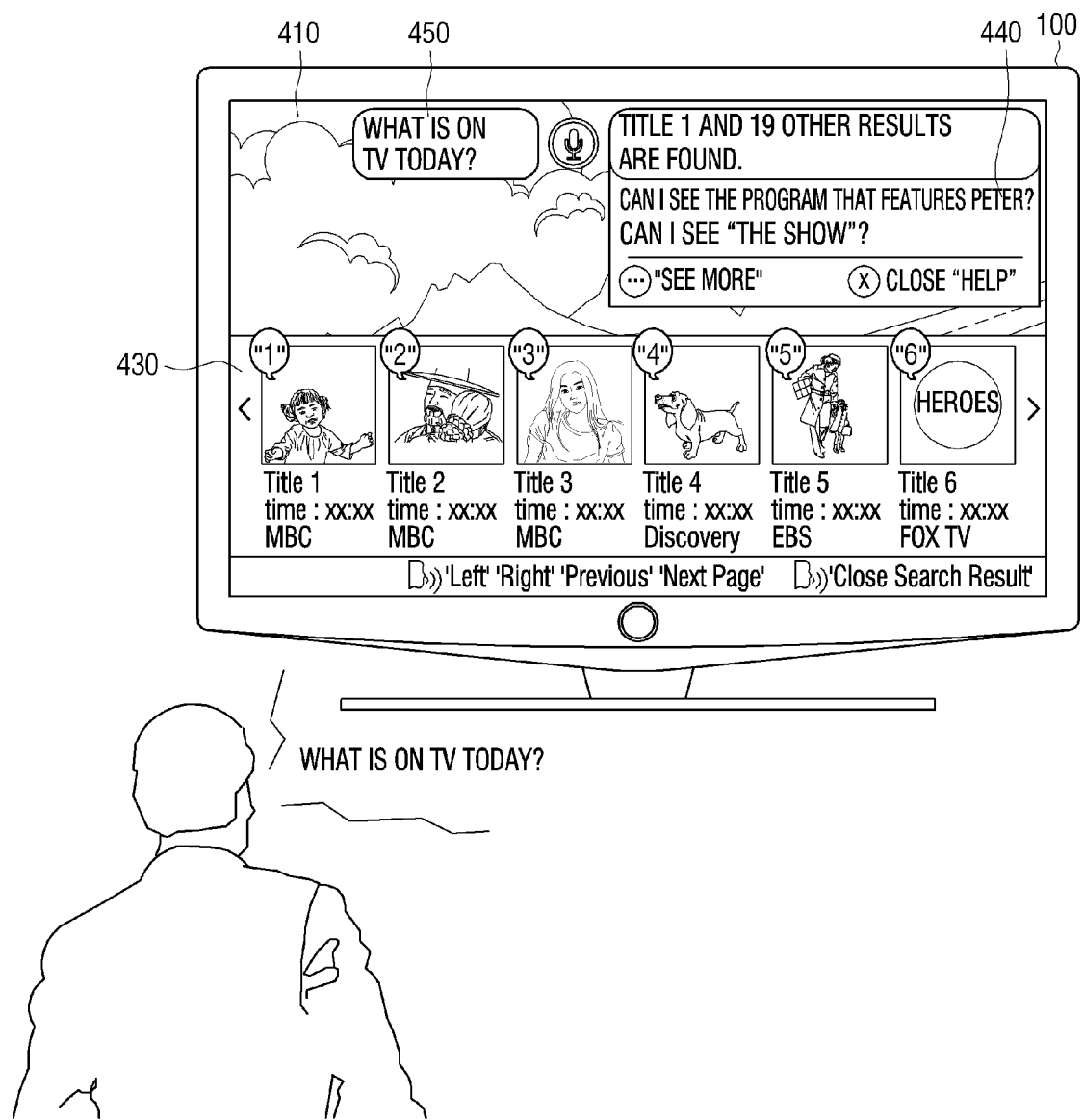

Referring to FIGS. 8A to 8C, when the user utters "What is on TV today?", the controller 150 may output a list 430 of broadcast programs to be broadcasted today as the system response, based on the response information received from the second server 300. The controller 150 may then output voice command guide 440 representing the user voice applicable on the list 430 outputted as the system response.

Referring to FIGS. 8A to 8C, the voice command guide 440 may display text in the slide show form representing the user voice that is applicable to the list 430 of broadcast programs outputted as the system response, such as, for example, "The third one, please" "Can I see details of the third one?", "What is on SBC (i.e., channel name)?". "Can I see documentary programs?", "Can I see the program that features Peter (i.e., appearing persons' name)?", or "Can I see "The Show" (i.e., broadcast program name), please?"

Meanwhile, the controller 150 may output information about the collected user voice. For example, when the text information corresponding to the user voice is received from the first server 200, the controller 150 may generate a UI that includes the received text information and output the same on the screen. That is, referring to FIGS. 8A to 8C, the controller 150 may output "What is on TV today?" 450.

Accordingly, when the user utters "What is on SBC (i.e., channel name)?" the controller 150 may output, as the system response, a list of broadcast programs provided by SBC (i.e., channel name) among the today's broadcast programs, based on the response information received from the second server 300.

Meanwhile, the controller 150 may output guide to ensure correct user voices. To that purpose, the second server 300 may transmit the guide information to ensure correct user voices to the display apparatus 100.

That is, when there is no sample sentence matching the received text information, the controller 330 may determine the statistically similar sample sentence, as explained above. Accordingly, the controller 330 may transmit the response information to the display apparatus 100, together with information about the sample sentence that is statistically similar to the received user voice.

Figure 9:
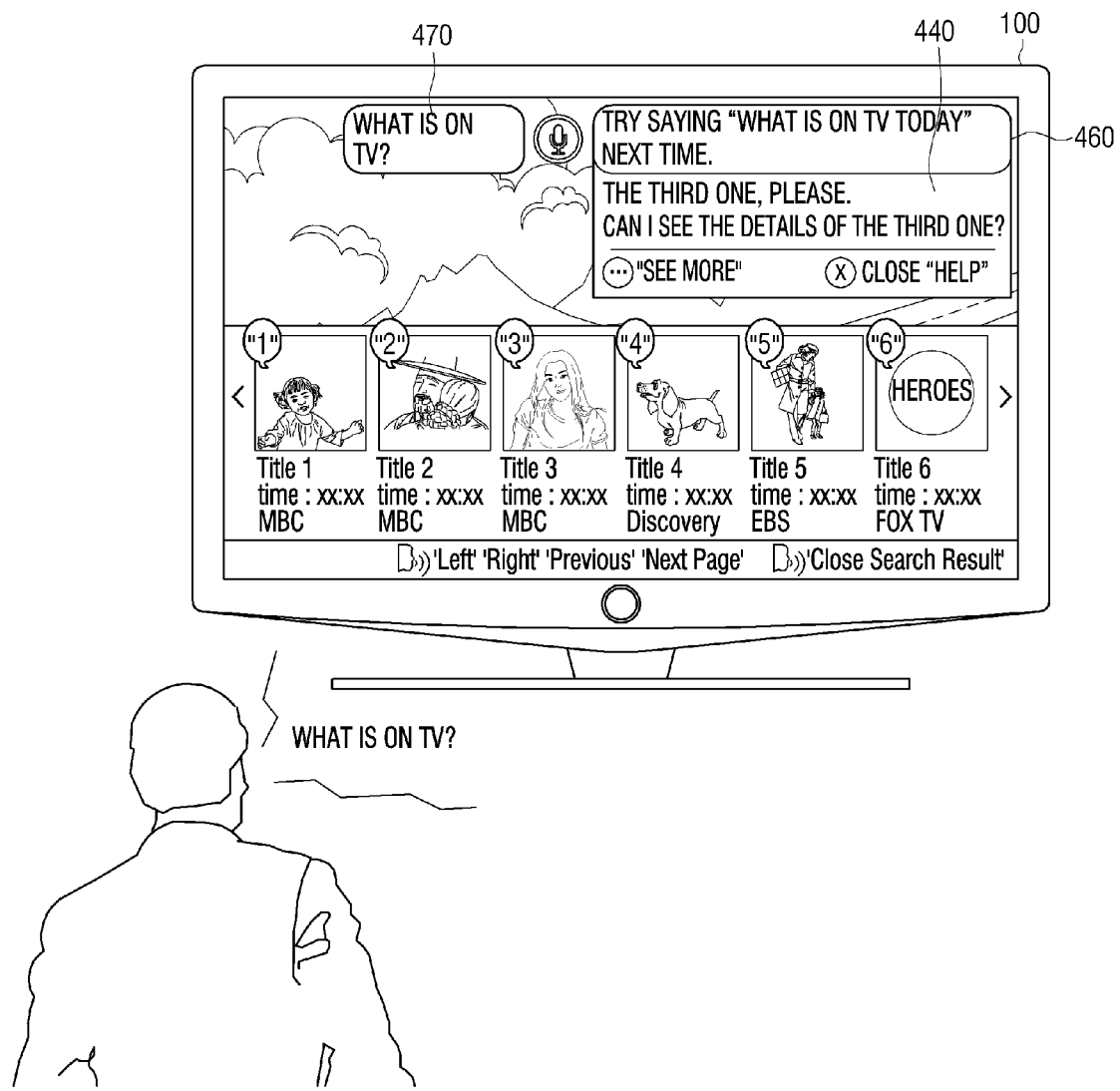

For example, referring to FIG. 9, when the user utters "What is on TV?", the controller 330 determines that "What is on TV?" is statistically similar to "What is on TV today?" among the pre-stored sample sentences, and express "What is on TV today?" and transmit the same to the display apparatus 100. Accordingly, the controller 150 may generate a UI such as "Try saying "What is on TV today" next time" and output this as the guide 460 to ensure more accurate user voice.

In one exemplary embodiment, the controller 150 may output information about collected user voice. Referring to FIG. 9, the controller 150 may output "What is on TV?" 470.

Meanwhile, the form of the voice command guide is not limited to the specific example provided above, and accordingly, various forms of the voice command guide can be provided.

Figure 10A:
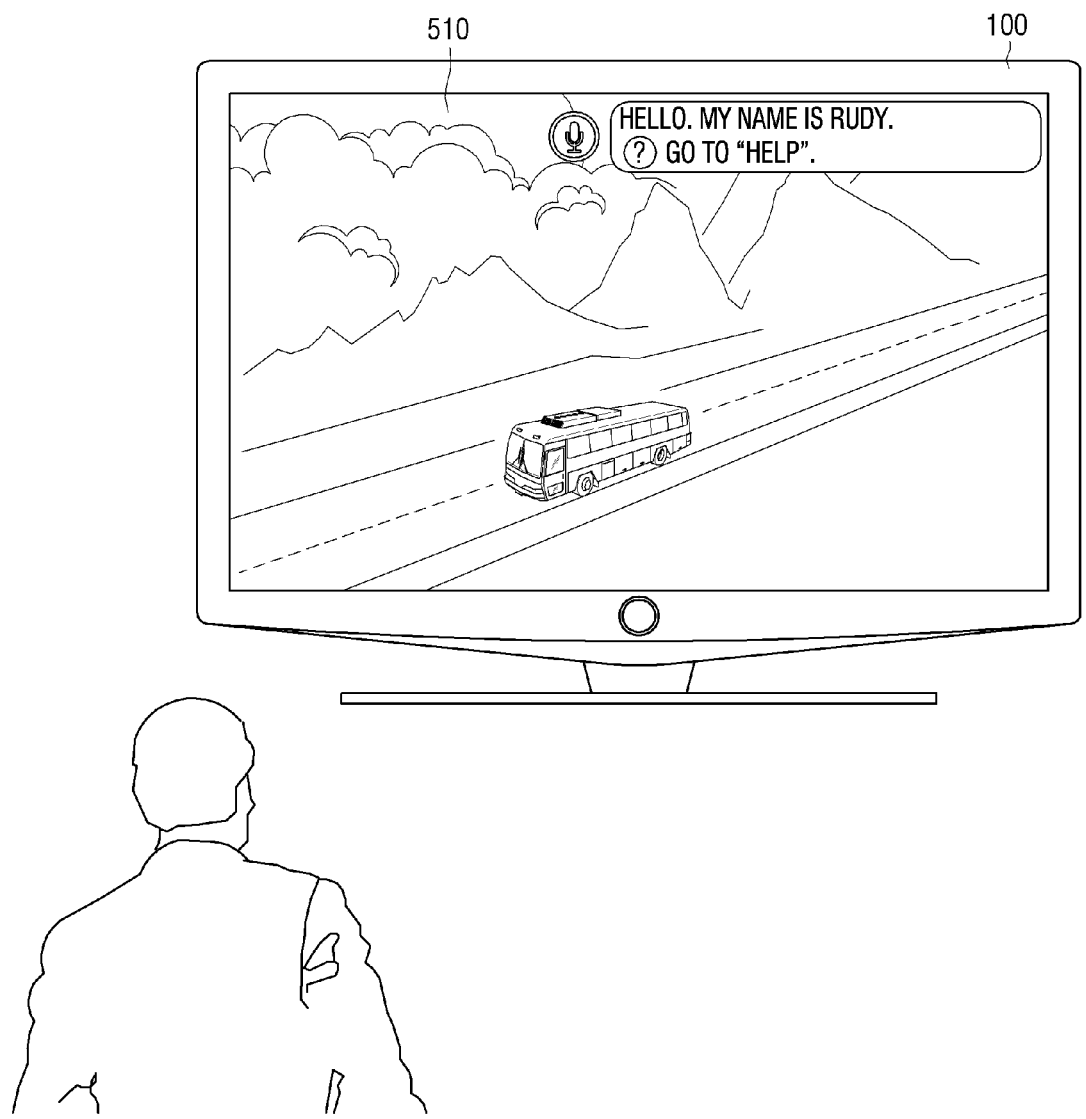
Figure 10B:
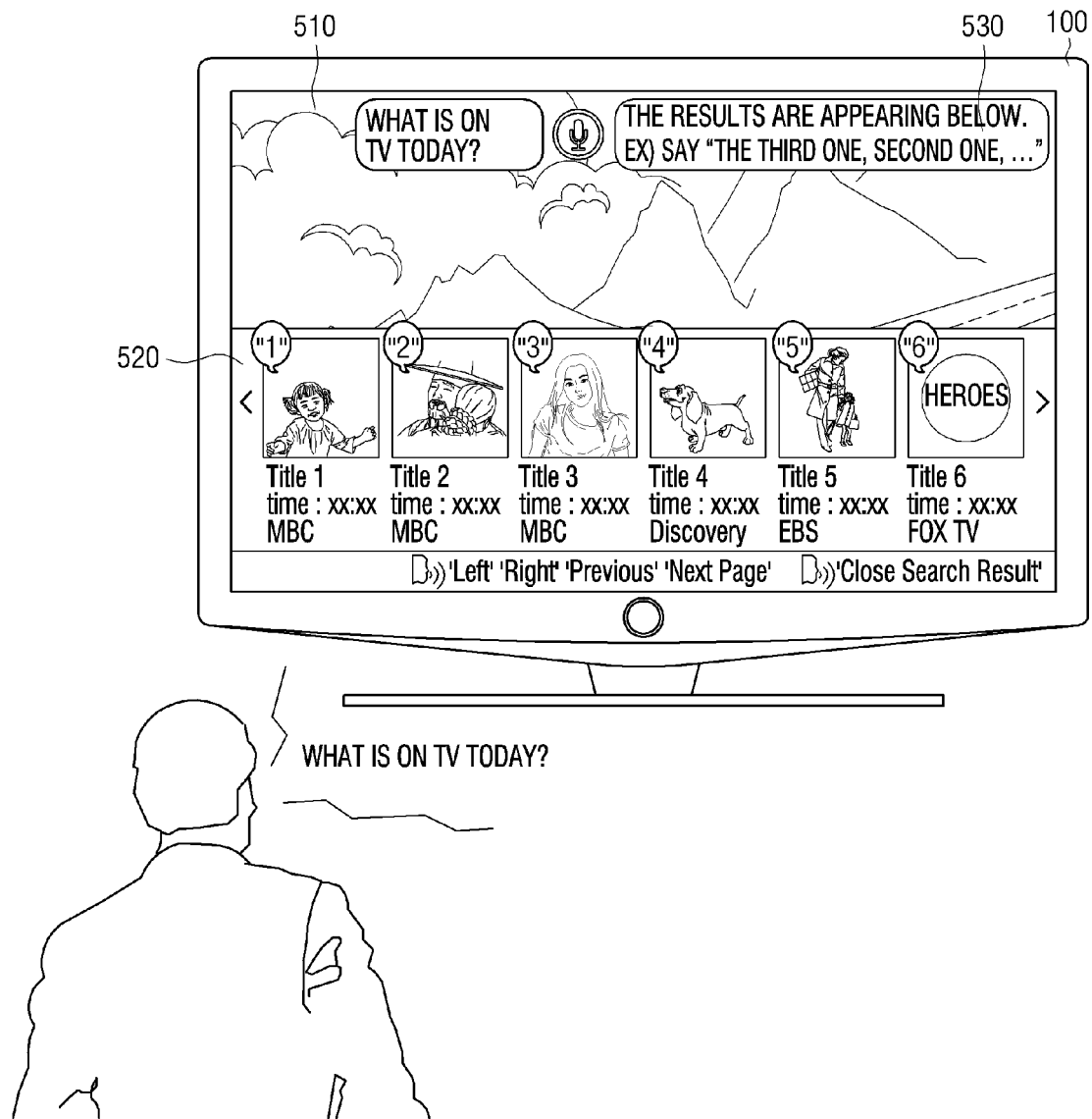

For example, referring to FIGS. 10A and 10B, when the user voice "What is on TV today?" is collected in a situation that the initial screen 510 is outputted, the controller 150 may output a system response based on a list 520 of programs to be broadcasted today, and output voice command guide 530 that includes information about the user voice usable with respect to the list 520. More specifically, referring to FIG. 10B, the controller 150 may output voice command guide 530 such as "Say "The third one, second one, . . . "" and so on.

Figure 11:
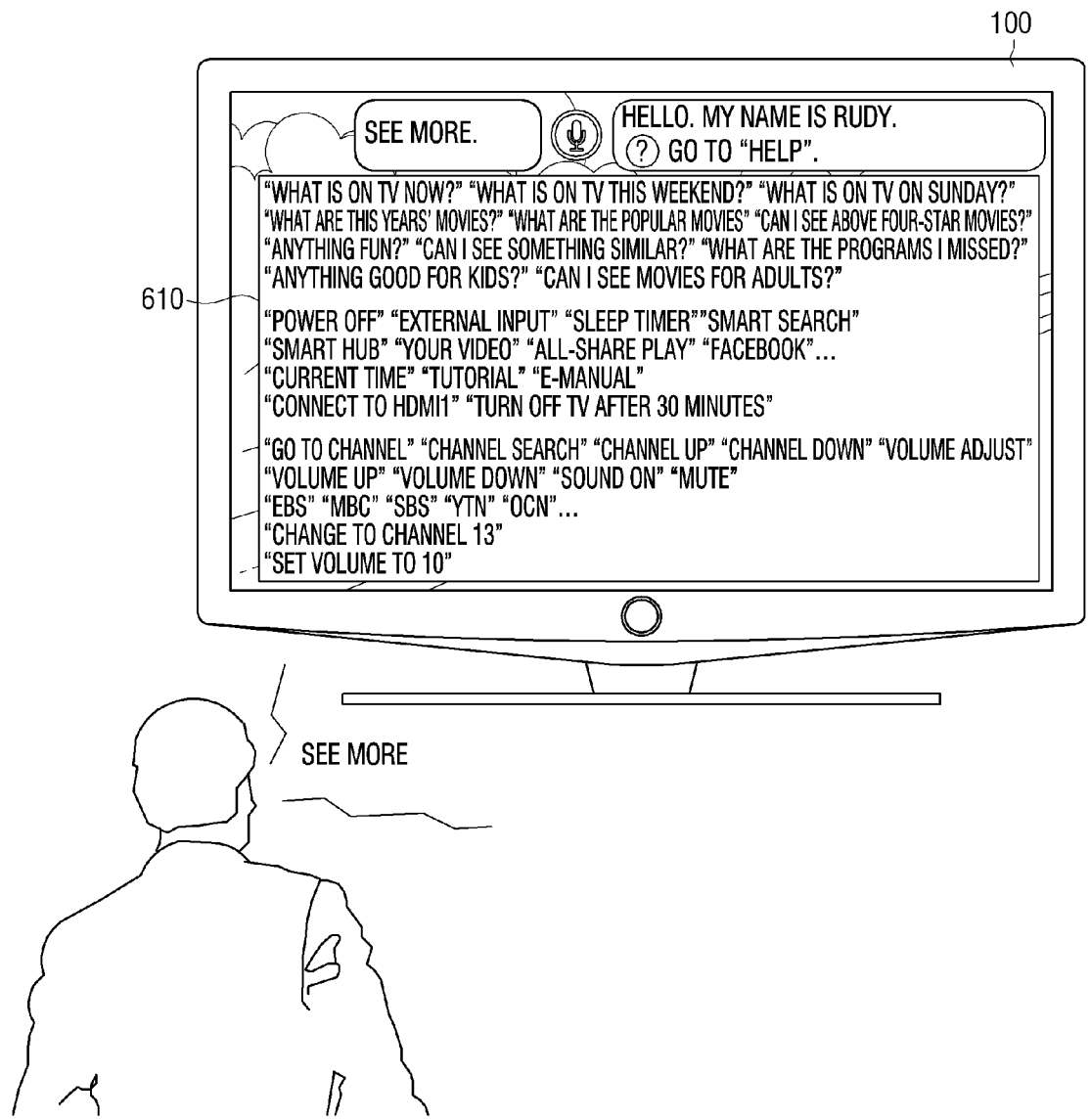

Meanwhile, FIG. 11 illustrates an example where the user utters "See more" in a state where the initial screen is displayed. In this example, the second server 300 may transmit a control command to output information about usable user voices on the display apparatus 100, to the display apparatus 100.

Accordingly, based on the received control command, the controller 150 may generate UI 610 that includes information about the usable user voices (see FIG. 11), and output the same. Meanwhile, the information about usable voice at the display apparatus 100 may be pre-stored in the display apparatus 100 or received from the second server 300.

Figure 12:
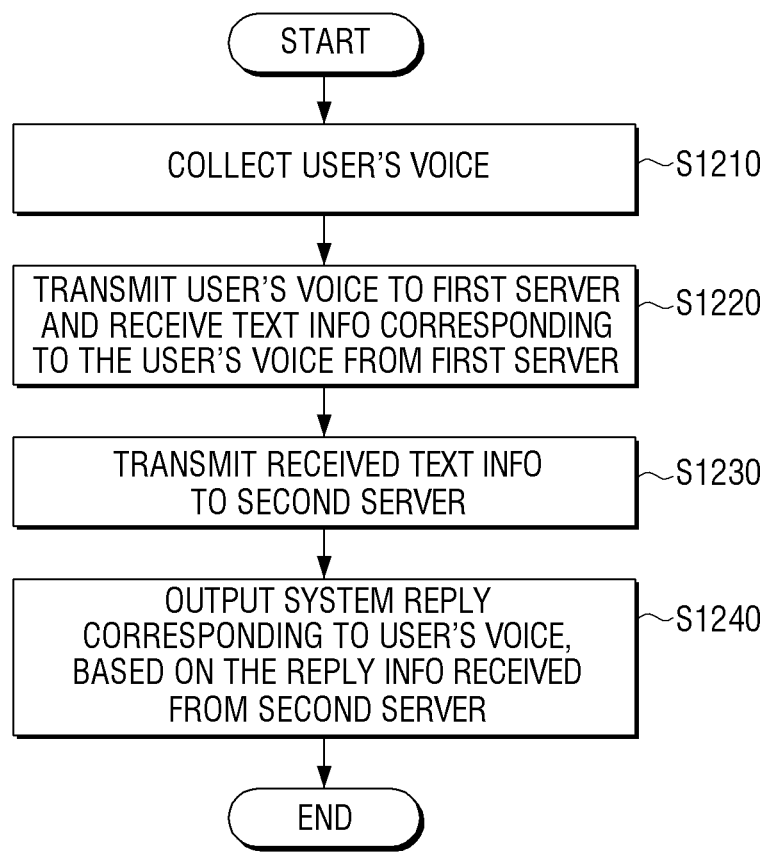
FIG. 12 is a flowchart provided to explain a control method of a display apparatus according to an exemplary embodiment.

FIG. 12 is a flowchart provided to explain a control method of a display apparatus according to an exemplary embodiment.

At S1210, the user voice is collected.

At S1220, the user voice is transmitted to the first server 200, and text information corresponding to the user voice is received from the first server 200. At S1230, the received text information is transmitted to the second server 300.

At S1240, when the response information corresponding to the text information is received from the second server 300, based on the response information, the system response corresponding to the user voice is outputted. The voice command guide applicable to the current situation of the display apparatus may be outputted.

That is, when the system response corresponding to the user voice is outputted, the voice command guide related with the system response may be outputted.

In the above example, when a list of contents searched in response to the user voice to search contents is outputted, a voice command guide to filter the content included in the content list may be outputted.

Further, when the list of contents searched for in response to the user voice to search contents is outputted, at least one of a voice command guide to execute specific content included in the content list and a voice command guide to output details of specific content may be outputted.

Further, when an application executing screen is outputted in response to user voice to execute an application, a voice command guide applicable on the application executing screen may be outputted.

The above will be referenced to the explanation provided above with reference to FIGS. 1 to 11, and will not be redundantly explained below for the sake of brevity.

Further, a non-transitory computer readable medium recording therein program to sequentially perform a control method according to exemplary embodiments may be provided. The 'non-transitory computer readable recording medium' refers to a medium which stores data semi-permanently and can be read by devices. Specifically, the above various applications or programs may be stored and provided in non-transitory computer readable recording medium such as CD, DVD, hard disk, Blu-ray disk, USB, memory card, or ROM.

Further, although the block diagrams of the display apparatus and servers omit a bus, communication among the respective components of the display apparatus and servers may be performed via the bus. Further, each device may additionally include at least one of a processor such as CPU, a microprocessor, a hardware module, or a circuit to perform various steps explained above.

The foregoing exemplary embodiments and advantages are merely exemplary and are not to be construed as limiting the exemplary embodiments. The present teaching can be readily applied to other types of apparatuses. Also, the description of the exemplary embodiments is intended to be illustrative, and not to limit the scope of the inventive concept, as defined by the appended claims, and many alternatives, modifications, and variations will be apparent to those skilled in the art.

What is claimed is:

1. An electronic apparatus, comprising:
   a display configured to output text;
   a microphone configured to receive a user voice; and
   a controller configured to control the display to output a system response corresponding to the user voice,
   wherein the controller is further configured to control the display to output a voice command guide including at least one voice command that is receivable by the microphone and that is applicable to a current situation of the electronic apparatus, and
   wherein the voice command guide comprises different voice commands according to whether the electronic apparatus is in a current situation in which the electronic apparatus displays a broadcast program or the electronic apparatus is in a current situation in which electronic apparatus executes an application.

2. The electronic apparatus of claim 1, wherein, in response to the system response corresponding to the user voice being outputted, the controller is further configured to control the display to output the voice command guide including a guide which is related with the system response.

3. The electronic apparatus of claim 1, wherein, in response to a list of contents, resulting from a search performed in accordance with the user voice including a command to search for contents, being outputted, the controller is further configured to control the display to output the voice command guide including a guide to filter the content included in the list of contents.

4. The electronic apparatus of claim 1, wherein, in response to a list of contents, resulting from a search performed in accordance with the user voice including a command to search for contents, being outputted, the controller is further configured to control the display to output the voice command guide including at least one of a guide to execute specific content included in the list of contents, and a guide to output details of the specific content.

5. The electronic apparatus of claim 1, wherein, in response to an application executing screen, corresponding to the user voice including a command to execute the corresponding application, being outputted, the controller is further configured to control the display to output the voice command guide including a guide applicable to the application executing screen, and
   wherein the outputting the application executing screen comprises displaying the application executing screen on the display.

6. The electronic apparatus of claim 1, wherein the electronic apparatus is a display apparatus.

7. The electronic apparatus of claim 1, further comprising:
   a first communicator configured to transmit the user voice to a first server and receive from the first server text information corresponding to the user voice; and
   a second communicator configured to transmit the received text information to a second server, wherein
   in response to response information corresponding to the text information being received from the second server, the controller is further configured to control the display such that the system response is outputted based on the response information.

8. A control method of an electronic apparatus, comprising:
   receiving a user voice;
   transmitting the user voice to a first server and receiving from the first server text information corresponding to the user voice;
   transmitting the received text information to a second server; and
   in response to response information corresponding to the text information being received from the second server, outputting a system response corresponding to the user voice based on the response information and outputting a voice command guide including at least one voice command that is receivable as the user voice and that is applicable to a current situation of the electronic apparatus,
   wherein the voice command guide comprises different voice commands according to whether the electronic apparatus is in a current situation in which the electronic apparatus displays a broadcast program or the electronic apparatus is in a current situation in which electronic apparatus executes an application.

9. The control method of claim 8, wherein, in response to a list of contents, resulting from a search performed in accordance with the user voice including a command to search for contents, being outputted, outputting the voice command guide including a guide to filter the content included in the list of contents.

10. The control method of claim 8, wherein, in response to a list of contents, resulting from a search performed in accordance with the user voice including a command to search for contents, being outputted, outputting the voice command guide including at least one of a guide to execute specific content included in the content list and a guide to output details of the specific content.

11. The control method of claim 8, wherein, in response to an application executing screen, corresponding to the user voice including a command to execute the corresponding application, being outputted, outputting the voice command guide including a guide applicable to the application executing screen.

12. The control method of claim 8, wherein the electronic apparatus is a display apparatus.

13. An electronic apparatus, comprising:
a display configured to output text; and
a controller configured to control the display to output a system response corresponding to a user voice received from an external microphone,
wherein the controller is further configured to control the display to output a voice command guide including at least one voice command that is receivable from the external microphone and that is applicable to a current situation of the electronic apparatus, and
wherein the voice command guide comprises different voice commands according to whether the electronic apparatus is in a current situation in which the electronic apparatus displays a broadcast program or the electronic apparatus is in a current situation in which electronic apparatus executes an application.

* * * * *